United States Patent
Nemoto

(10) Patent No.: US 6,637,294 B2
(45) Date of Patent: Oct. 28, 2003

(54) TRANSMISSION FOR VEHICLE

(75) Inventor: Shusuke Nemoto, Amagasaki (JP)

(73) Assignee: Kanzaki Kokyukoki Mfg. Co., Ltd (JP)

(*) Notice: Subject to any disclaimer, the term of this patent is extended or adjusted under 35 U.S.C. 154(b) by 21 days.

(21) Appl. No.: 09/949,812

(22) Filed: Sep. 12, 2001

(65) Prior Publication Data

US 2002/0033093 A1 Mar. 21, 2002

(30) Foreign Application Priority Data

Sep. 18, 2000 (JP) ........................................ 2000-282477

(51) Int. Cl.[7] ............................................... F16H 47/00
(52) U.S. Cl. ........................... 74/730.1; 74/720; 60/488
(58) Field of Search ............................... 74/720, 730.1, 74/606 R; 60/488

(56) References Cited

U.S. PATENT DOCUMENTS

| | | | |
|---|---|---|---|
| 3,177,665 A | 4/1965 | Power | |
| RE34,833 E | 1/1995 | Hasegawa et al. | |
| 5,850,736 A | * 12/1998 | Sakakura et al. | ............. 60/464 |
| 5,913,950 A | * 6/1999 | Matsufuji | ................... 74/730.1 |

FOREIGN PATENT DOCUMENTS

| GB | 2 032 586 A | 5/1980 |
|---|---|---|
| GB | 2032586 | 5/1980 |
| JP | 4-50180 | 11/1992 |
| JP | 11-091379 | 4/1999 |

* cited by examiner

*Primary Examiner*—Richard M. Lorence
*Assistant Examiner*—Dennis Abdelnour
(74) *Attorney, Agent, or Firm*—Sterne, Kessler, Goldstein & Fox P.L.L.C.

(57) ABSTRACT

The present invention provides a transmission for vehicle with an HST interposed in a drive power transmission path that includes: a housing; a center section having a plate-like shape with a first surface and a second surface opposite to the first surface with respect to a drive power transmission direction, and the center section being disposed within the housing; an input shaft extending through the center section; an output shaft disposed parallel with the input shaft and away from the same in a plate surface direction of the center section; a hydraulic pump body supported on the first surface of the center section and operatively connected to the input shaft; a hydraulic motor body supported on the second surface of the center section and being adapted to drive the output shaft upon receiving operational fluid discharged from the hydraulic pump body; a bearing plate fixed within the housing, facing either one of the first and second surfaces of the center section for supporting the input shaft; and an auxiliary pump disposed on the bearing plate and being adapted to be driven through the input shaft.

6 Claims, 17 Drawing Sheets

FIG.13
(a) 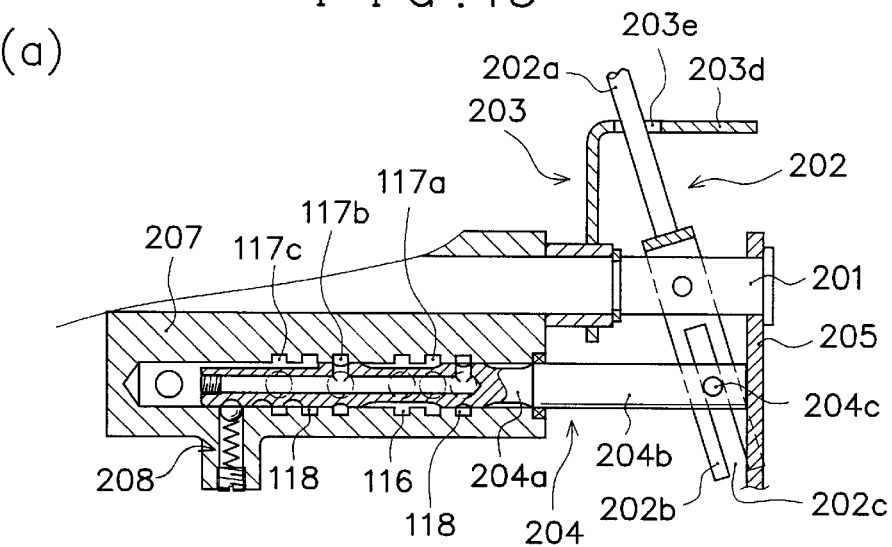
(b) 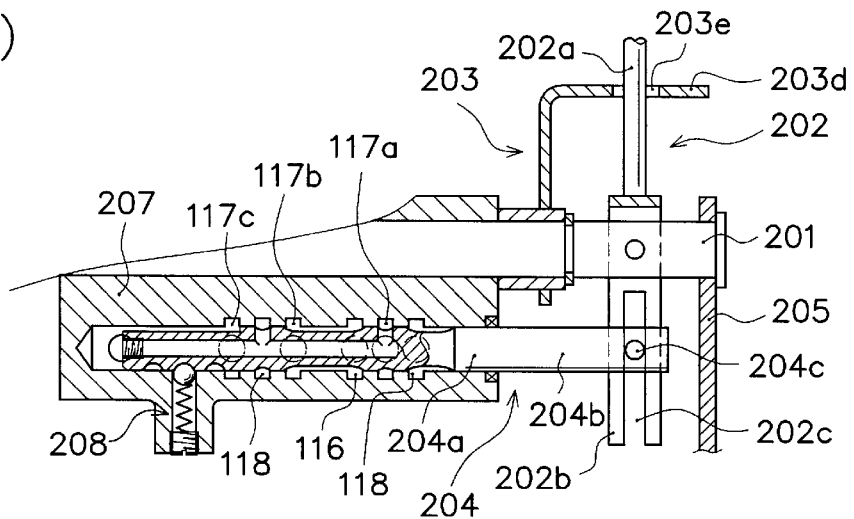
(c) 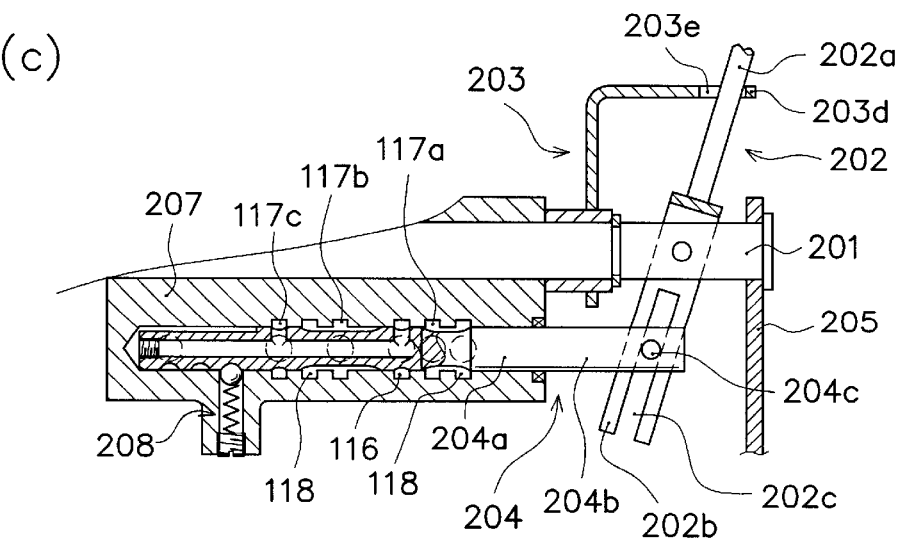

TRANSMISSION FOR VEHICLE

BACKGROUND OF THE INVENTION

Background of the Invention

The present invention relates to a transmission for vehicle that includes a hydraulic pump body and a hydraulic motor body, and an auxiliary pump for replenishing operational fluid to flow therebetween.

It is known from such as Japanese Patent Application Laid-open No. Hei-11-91379 that a transmission housing is also used as a part of a vehicle frame to simplify the vehicle structure and reduce the manufacturing cost.

According to the arrangement described in the above cited publication, along with the transmission housing a center section that supports thereon a hydraulic pump and a hydraulic motor also makes up a part of the vehicle frame. This arrangement poses a problem as described below.

The center section is originally intended to support thereon the hydraulic pump and the hydraulic motor, as well as serving as a fluid circuit for HST operational fluid that circulates between the hydraulic pump and hydraulic motor. Therefore, it may be sufficient for the center section to be tolerable against the total weight of the hydraulic pump and the hydraulic motor and have such a stiffness as to be tolerable against the maximum preset hydraulic pressure in the fluid circuit.

However, as described in the above-cited publication, where the center section is connected to the transmission housing via their connecting portions under an exposed condition, their connecting portions each are subjected to bending stress due to the weight of a driver supported by a vehicle body frame, and that of vehicle components mounted on or towed by the vehicle body frame.

Therefore, with the arrangement described in the above-cited publication, the center section is required to have a higher stiffness than originally required. This poses a problem that the manufacturing cost cannot be substantially reduced whether a part of the vehicle body frame is made up of the transmission housing for reduction of the cost.

In the transmission described in the above-cited publication, the hydraulic pump and the hydraulic motor are arranged in parallel along a vehicle width direction. This arrangement necessitates a longer distance between a pump shaft of the hydraulic pump and a motor shaft of the hydraulic motor, and hence poses a problem of inviting larger-sizing of the transmission itself.

In the transmission of the above type, an auxiliary pump for replenishing operational fluid between the hydraulic pump and the hydraulic motor must be mounted to an input shaft of the HST or the pump shaft. Accordingly, to reduce the size of the transmission, it is required to take the existence of the auxiliary pump into consideration. However, it is apparent that the transmission of the above-cited publication was designed with no consideration for addressing this matter.

The present invention has been thus conceived in consideration of the above prior art. It is an object of the present invention to provide a transmission that is capable of being manufactured in reduced size, while achieving a relatively low manufacturing cost of the center section that supports thereon the hydraulic pump body and the hydraulic motor body.

It is another object of the present invention to provide a transmission that allows the adjustment of the HST to be performed by independent adjustment of the HST itself, while achieving the above object.

SUMMARY OF THE INVENTION

To achieve the above objects, there is provided a transmission for vehicle with an HST interposed in a drive power transmission path that includes: a housing; a center section having a plate-like shape with a first surface and a second surface opposite to the first surface with respect to a drive power transmission direction, and the center section being disposed within the housing; an input shaft extending through the center section; an output shaft disposed parallel with the input shaft and away from the same in a plate surface direction of the center section; a hydraulic pump body supported on the first surface of the center section and operatively connected to the input shaft; a hydraulic motor body supported on the second surface of the center section and being adapted to drive the output shaft upon receiving operational fluid discharged from the hydraulic pump body; a bearing plate fixed within the housing, facing either one of the first and second surfaces of the center section for supporting the input shaft; and an auxiliary pump disposed on the bearing plate and being adapted to be driven through the input shaft.

With the transmission having the above arrangement, the distance between the input shaft and the output shaft can be minimized as much as possible, even if the transmission is provided with the auxiliary pump. Thus, the transmission can be manufactured in reduced size.

In the transmission for vehicle having the above arrangement, the input shaft preferably has a downstream end with respect to the drive power transmission direction, which downstream end of the input shaft extending through the center section and being operatively connected to a PTO shaft.

With this arrangement, the drive power transmission path of the PTO can be efficiently arranged.

The transmission for vehicle preferably has the housing that includes a flywheel housing for accommodating a flywheel, and a an intermediate housing joined to the flywheel housing; the center section that is designed to be fixed to the flywheel housing or the intermediate housing in proximity to a joined portion between the flywheel housing and the intermediate housing, while supporting the hydraulic pump body and the hydraulic motor body; and the hydraulic pump body, the hydraulic motor body and the center section are enclosed within an accommodation member made up of the flywheel housing and the intermediate housing when both the housings have been joined together.

With the above arrangement, even in case that the housing is used as a part of the vehicle body frame, bending stress can effectively be prevented from applying on the hydraulic pump body, the hydraulic motor body and the center section. Hence, the manufacturing cost of the center section can be reduced.

In the above arrangement, the center section with the hydraulic pump body and the hydraulic motor body supported thereon is fixed to the flywheel housing or the intermediate housing, in which the hydraulic pump body and the hydraulic motor body respectively and inherently have casings. This arrangement enables the HST to be independently assembled, thereby achieving improved operational efficiency in adjusting the HST and incorporating the same in the transmission.

Also, in the above arrangement, the hydraulic pump and the hydraulic motor are enclosed with a double layer of wall, namely the exclusively designed casings respectively provided on the hydraulic pump body and the hydraulic motor body, and the flywheel housing or the intermediate housing. Whereby, improved noise reduction effect can be achieved.

According to another aspect of the present invention, there is provided a transmission for vehicle with an HST and a power shift device interposed in tandem in a drive power transmission path that includes: a housing; first and second plate-like members disposed within the housing in such a manner as to be positioned away from each other along a drive power transmission direction, while respectively having each-other facing surfaces, through which the first and second plate-like members face each other; an input shaft extending through the first plate-like member; an output shaft disposed parallel with the input shaft and away from the same in a plate surface direction of the first plate-like member; a hydraulic pump body supported on a surface opposite to the each-other facing surface of the first plate-like member, and operatively connected to the input shaft; a hydraulic motor body supported on the each-other facing surface of the first plate-like member, and being adapted to drive the output shaft upon receiving operational fluid discharged from the hydraulic pump body; an auxiliary pump disposed on the second plate-like member and being adapted to be driven through the input shaft; and wherein the second plate-like member supports thereon a clutch shaft of the power shift device, and has a hydraulic fluid passage for supplying therethrough pressurized hydraulic fluid discharged from the auxiliary pump to a hydraulic clutch on the clutch shaft.

With the transmission having the above arrangement, the distance between the input shaft and the output shaft can be minimized as much as possible, even if the transmission is provided with the auxiliary pump. Thus, the transmission can be manufactured in reduced size.

In addition, the hydraulic fluid passage from the auxiliary pump to the hydraulic clutch can be shortened.

The input shaft preferably has a downstream end with respect to a drive power transmission direction, the downstream end of the input shaft extending through the center section and being operatively connected to a PTO shaft.

With the above arrangement, the drive power transmission path of the PTO can efficiently be arranged.

The output shaft and the clutch shaft are preferably disposed coaxial with each other and are relatively non-rotatably connected to each other.

The transmission for vehicle is preferably arranged so that the housing includes a flywheel housing for accommodating a flywheel, an intermediate housing joined to the flywheel housing and a clutch housing joined to the intermediate housing for accommodating the power shift device; the first plate-like member is designed to be fixed to the flywheel housing or the intermediate housing in proximity to a joined portion between the flywheel housing and the intermediate housing, while supporting the hydraulic pump body and the hydraulic motor body; the second plate-like member is designed to be fixed to the intermediate housing and the clutch housing in proximity to a joined portion between the intermediate housing and the clutch housing; the hydraulic pump body, the hydraulic motor body and the first plate-like member are enclosed within an accommodation member made up of the flywheel housing and the intermediate housing when both the housings have been joined together; and the second plate-like member is enclosed within an accommodation member made up of the intermediate housing and the clutch housing when both the housings have been joined together.

With the above arrangement, even in case that the housing is used as a part of the vehicle body frame, bending stress can effectively be prevented from applying on the hydraulic pump body, the hydraulic motor body, the first plate-like member and the second plate-like member. Hence, the manufacturing costs of the first plate-like member and the second plate-like member can be reduced.

In the above arrangement, the first plate-like member with the hydraulic pump body and the hydraulic motor body supported thereon is fixed to the flywheel housing or the intermediate housing, in which the hydraulic pump body and the hydraulic motor body respectively and inherently have casings. This arrangement enables the HST to be independently assembled, thereby achieving improved operational efficiency in adjusting the HST and incorporating the same into the transmission.

The hydraulic pump and the hydraulic motor are also enclosed with a double layer of wall, namely with the exclusively designed casings respectively provided on the hydraulic pump body and the hydraulic motor body, and the flywheel housing or the intermediate housing. Whereby, improved noise reduction effect can be achieved.

The transmission for vehicle preferably further includes a PTO shaft disposed coaxial with the input shaft and operatively connected to the same, and the driven shaft has a hollowed body, into which the PTO shaft is inserted.

According to this arrangement, although the transmission has a three-shaft-construction with the clutch shaft, driven shaft and PTO power transmission shaft, it can be constructed as having substantially two shafts, so that the transmission itself can be manufactured in reduced size.

In the transmission for vehicle with the HST and the power shift device interposed in tandem in a drive power transmission, the power shift device may include a driven shaft disposed substantially parallel to the clutch shaft and a plurality of hydraulic clutches for stepwisely changing the speed of the drive power between the clutch shaft and the driven shaft, in addition to the clutch shaft that is disposed coaxial with the output shaft and relatively non-rotatably connected to the same.

BRIEF DESCRIPTION OF THE DRAWINGS

The above, and other objects, features and advantages of the present invention will become apparent from the detailed description thereof in conjunction with the accompanying drawings wherein.

FIG. 13 are cross-sections taken along lines XII—XII in FIG. 11. Specifically, FIGS. 13(a)–13(c) each illustrate a hydraulic clutch type speed change device engaging with the first to third speeds.

DETAILED DESCRIPTION OF THE PREFERRED EMBODIMENT

Figure 1:
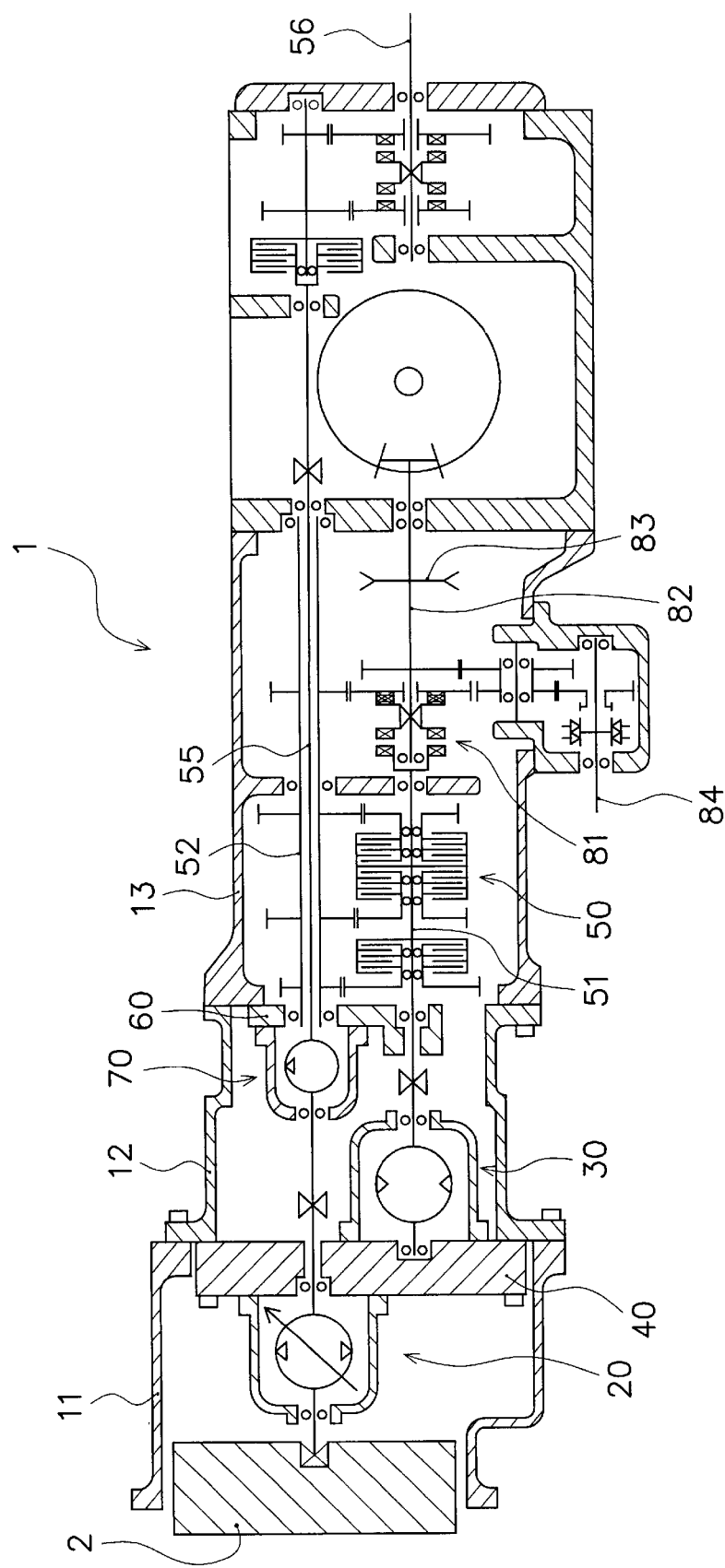
FIG. 1 is a model view illustrating a drive-power transmission path of a vehicle to which one embodiment of the transmission of the present invention is applied.
Figure 2:
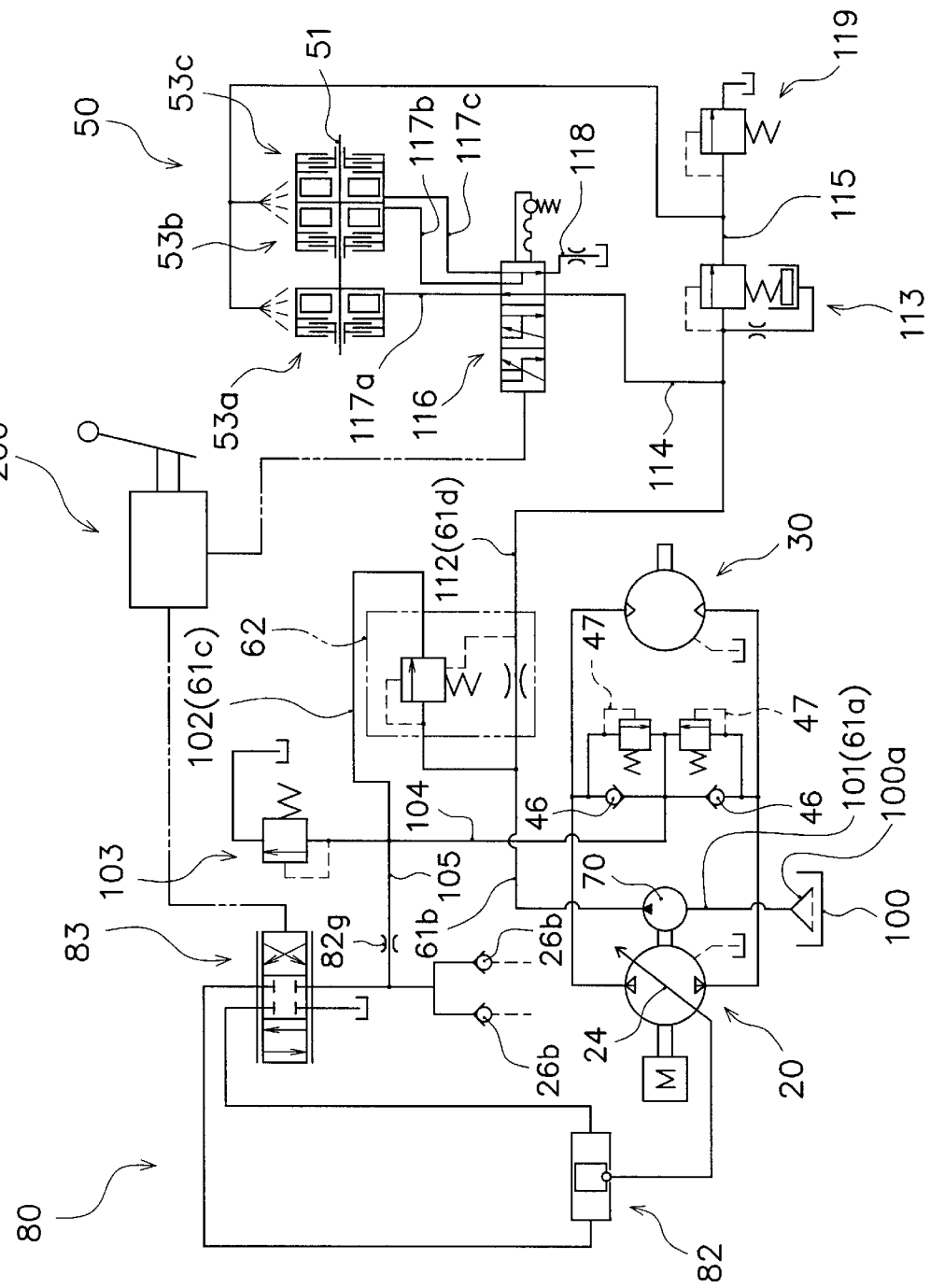
FIG. 2 is a hydraulic circuit diagram of the transmission illustrated in FIG. 1.
Figure 3:
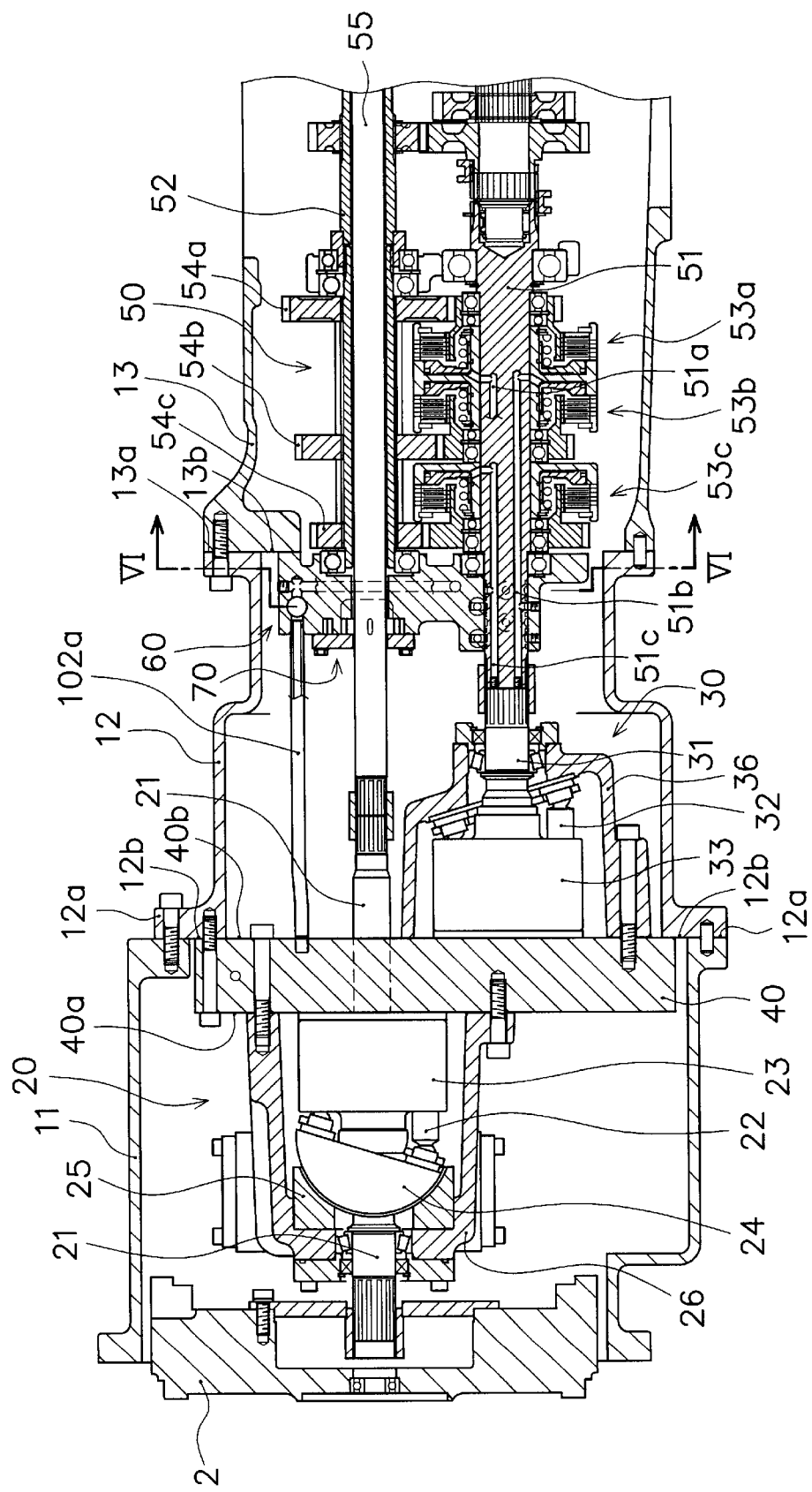
FIG. 3 is a longitudinal cross-section of the transmission illustrated in FIG. 1.

The embodiments of the transmission according to the present invention will be hereinafter described with reference to the drawings attached hereto. FIG. 1 is a model view illustrating a drive-power transmission path of a vehicle to which one embodiment of a transmission of the present invention is applied. FIG. 2 is a hydraulic circuit diagram of the transmission illustrated in FIG. 1. FIG. 3 is a longitudinal cross-section of the transmission illustrated in FIG. 1.

As illustrated in FIGS. 1 and 3, transmission 1 includes housing 10, hydraulic pump unit 20, hydraulic motor unit 30 that makes up the HST in cooperation with the hydraulic pump unit 20, center section 40 that supports thereon the hydraulic pump unit 20 and hydraulic motor unit 30 while enabling fluid communication therebetween.

In this embodiment, the housing 10 has flywheel housing 11 that accommodates flywheel 2 operatively connected to an engine (not shown) mounted on the vehicle, and intermediate housing 12 jointed to the flywheel housing 11.

At least one of the hydraulic pump unit 20 and the hydraulic motor unit 30 is of a variable displacement type that enables the variation in the inflow/outflow amounts of hydraulic fluid through the operation of the swash plate. Thus, the motor shaft of the hydraulic motor unit 30 can produce the drive power which has been non-stepwisely changed by manipulating the swash plate. In this embodiment, the hydraulic pump unit 20 is designated as being of the variable displacement type while the hydraulic motor unit 30 being of a fixed displacement type.

Figure 4:
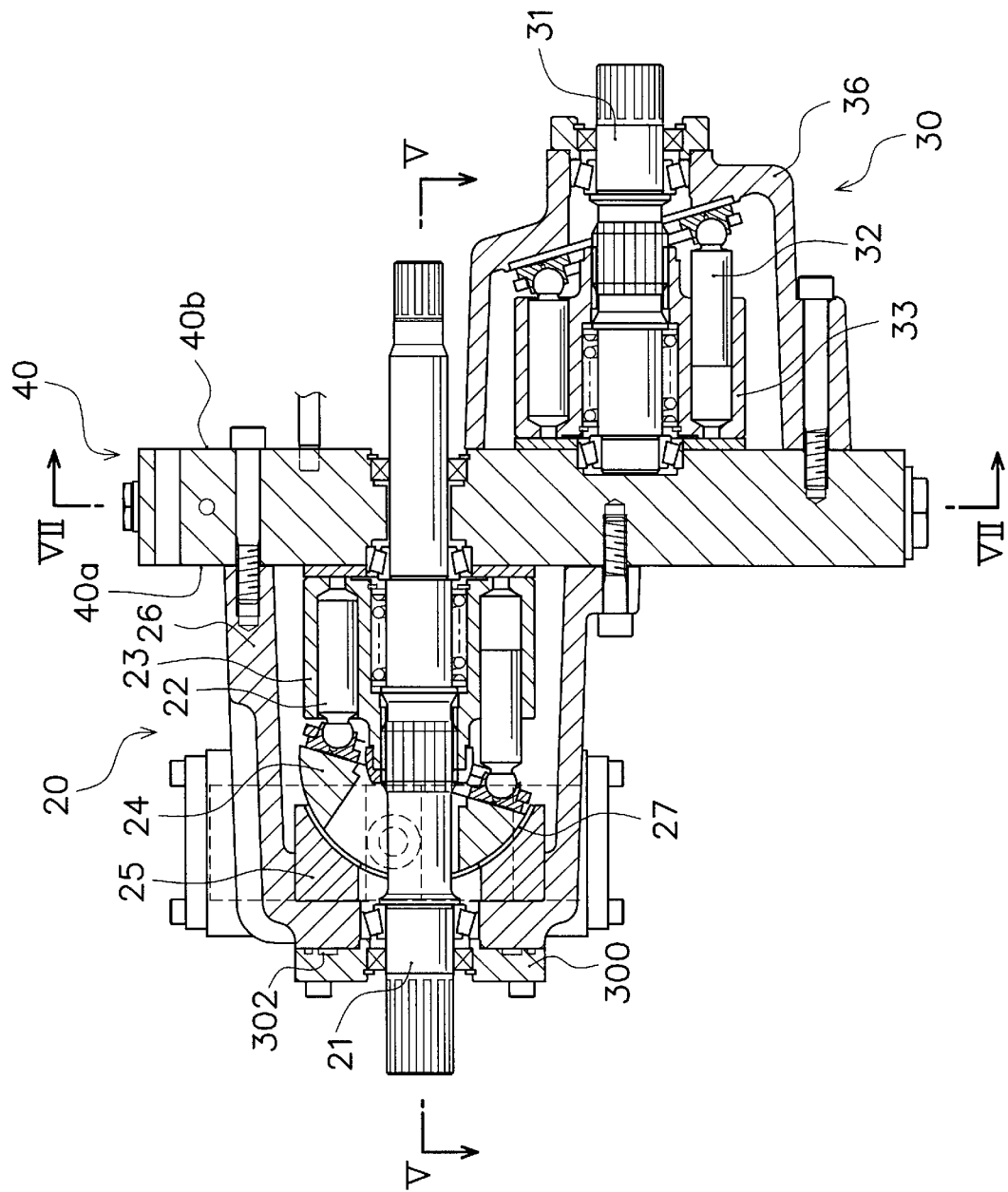
FIG. 4 is an enlarged sectional side view of an HST in the transmission illustrated in FIG. 1.
Figure 5:
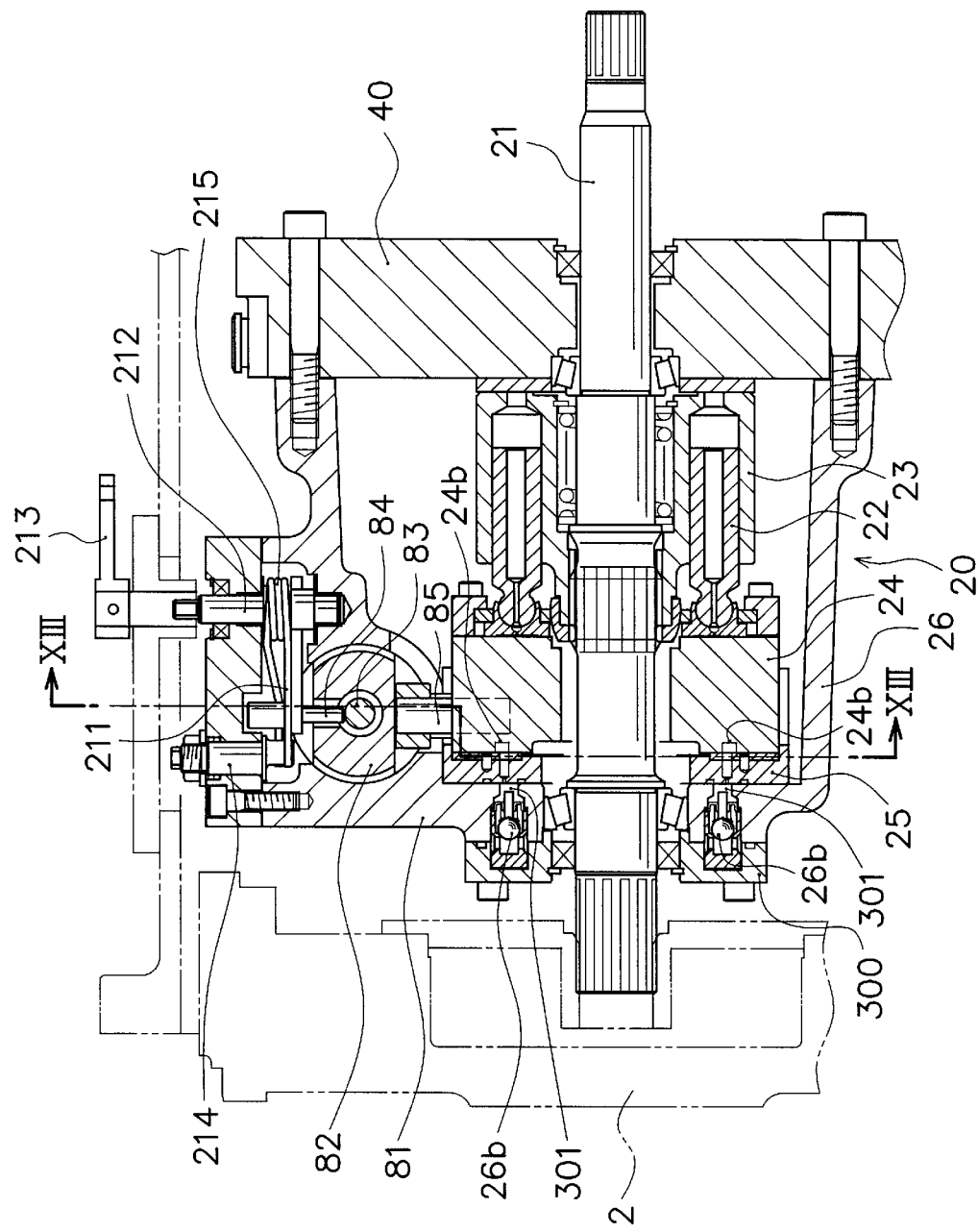
FIG. 5 is a cross-section taken along lines V—V in FIG. 4.

FIG. 4 is an enlarged sectional side view of an HST unit that is made up of the hydraulic pump unit 20, the hydraulic motor unit 30 and the center section 40. FIG. 5 is a cross-section taken along lines V—V in FIG. 4.

As illustrated in FIGS. 3–5, the center section 40 has a pair of support surfaces that respectively face a upstream side and a downstream side with respect to the drive-power transmission direction. As used throughout the description, the directional term "upstream" and "downstream" are relative to the drive-power transmission direction. The hydraulic pump unit 20 and the hydraulic motor unit 30 are respectively supported on the support surfaces 40a, 40b on the upstream side and the downstream side of the center section 40. Thus, the hydraulic pump unit 20 and hydraulic motor unit 30 are arranged with the center section 40 therebetween. This arrangement can achieve a shortened distance between hereinafter described pump shaft 21 and motor shaft 31, and hence reduce the size of the transmission 1 in its height direction or width direction.

The hydraulic pump unit 20 is herein designated as being an axial piston pump of a variable displacement type, and supported on the support surface 40a on the upstream side along the drive-power transmission direction of the center section 40, as described above.

More specifically, the hydraulic pump unit 20 includes pump shaft 21 that has a upstream end operatively connected to the engine and a downstream end that passes rearwards through the center section 40, and a hydraulic pump body that is supported on the support surface 40a on the upstream side of the center section 40 and is adapted to be driven through the pump shaft 21.

The hydraulic pump body includes piston unit 22 that is reciprocated by the rotation of the pump shaft 21, cylinder block 23 that is supported on the support surface 40a on the upstream side of the center section 40 to guide the reciprocal movement of the piston unit 22, cradle type movable swash plate 24 that is adapted to limit the stroke length of the piston unit and varies the inflow/outflow amounts of hydraulic fluid in the piston unit according to its slanting angle, swash plate support block 25 that slidably supports the movable swash plate 24, and pump casing 26 that is mounted on the support surface 40a of the center section 40, enclosing the piston unit 22, the cylinder block 23, the movable swash plate 24 and the swash plate support block 25.

The hydraulic pump unit 20 is preferably provided with thrust metal 27 interposed between the movable swash plate 24 and the support block 25. The thrust metal 27 is adapted to improve the slidability of the movable swash plate to the support block 25, and therefore provides desirable result particularly for the HST in its a high load operation.

In this embodiment, the hydraulic pump unit 20 of the variable displacement type is designed so that the movable swash plate is slantingly moved through the utilization of hydraulic action effected by a hereinafter described hydraulic servo mechanism.

The hydraulic motor unit 30 includes a hydraulic motor body that is supported on the support surface 40b on the downstream side of the center section 40, and motor shaft 31 that is driven by the hydraulic motor body.

The hydraulic motor body includes cylinder block 33, piston unit that is reciprocably supported on the cylinder block 33, and motor case 36 that is mounted on the center section to enclose these members.

The motor shaft 31 is designed to rotate in response to the reciprocal movement of the piston unit 32, and disposed with its downstream end extending rearwards from the motor casing 36.

In this embodiment, the HST unit can be separately assembled by the interconnection of the pump unit 20, hydraulic motor unit 30 and center section 40. Accordingly, the adjustment of the HST can be done by the independent adjustment of the HST itself, thereby achieving an improved assembling efficiency.

As illustrated in FIG. 3, the center section 40 is designed to be fixed on either the flywheel housing 11 or the intermediate housing 12 via their connected portion, while supporting thereon the hydraulic pump unit 20 and the hydraulic motor unit 30.

In this embodiment, abutting surface 12a of the intermediate housing 12 to the flywheel housing 11 extends radially inwardly to form extension surface 12b, to which the center section 40 is fixed. However, the present invention is not necessarily limited to this embodiment. Rather, various embodiments can be applied. That is, it is possible to employ the arrangement that the intermediate housing 12 has an inner periphery on which a radially inwardly extending rib is integrally or separately formed, and the center section 40 is fixed to this rib. As an alternate arrangement, the center section 40 may be fixed to the flywheel housing 11 instead of being fixed to the intermediate section 12.

In this embodiment, the center section with the hydraulic pump unit and the hydraulic motor unit supported thereon can thus be fixed to the flywheel housing or the intermediate housing, whereby improved efficiency in incorporation of the HST unit in the transmission can be achieved.

As best illustrated in FIG. 3, the transmission 1 is designed so that the HST unit is enclosed within an enclosing member made up of both housings 11, 12 when the flywheel housing 11 has been joined with the intermediate housing 12.

Specifically, in this embodiment, the center section 40 that supports thereon the hydraulic pump unit 20 and the hydraulic motor unit 30 and achieves fluid communication therebetween can entirely be accommodated within the enclosing member made up of both housings 11, 12, without getting involved with the connection between the flywheel housing 11 and the intermediate housing 12.

With the above arrangement, it is unlikely that bending stress acting on the vehicle body frame reaches the center section 40, even if the flywheel housing 11 and the intermediate housing 12 are used as parts of the vehicle body frame. Therefore, it is not necessary to form the center section 40 with stiffness increased to such an extend as to render the center section tolerable against the bending stress. In other words, it is enough to form the center section 40 so that it can support the hydraulic pump unit 20 and the hydraulic motor unit 30 and be tolerable against the maximum pressure of the pressurized fluid flowing in a fluid circuit formed in the center section 40. Thus, the manufacturing cost of the center section 40 can be lowered. Also, the bending stress is unlikely to be applied on the hydraulic pump unit 20 and the hydraulic motor unit 30 supported by the center section 40, so that malfunctions or the like of both units 20, 30 can effectively be prevented.

The transmission 1 includes bearing plate 60 that is fixed within the housing, facing either one of the support surfaces 40a, 40b, and charge pump 70 for replenishing the HST unit with operational fluid.

It is preferable to have a PTO power transmission shaft which is to be connected with the pump shaft in a non-rotatable manner supported by the bearing plate 60, and a charge pump 70 mounted on the bearing plate 60 in such a manner as to be driven by the PTO power transmission shaft 55 or the pump shaft 21. This arrangement omits the necessity of separately providing a drive power transmission mechanism for the charge pump, as well as effectively preventing an increased shaft distance between the pump shaft 21 and the motor shaft 31 and hence a large-sized HST as compared with the arrangement with the charge pump mounted on the center section.

As illustrated in FIGS. 1 and 3, the transmission 1 also includes hydraulic clutch type speed change device 50 that is disposed on the downstream side of the HST unit, and clutch housing 13 that is connected to the intermediate housing 12 to accommodate the hydraulic clutch type speed change device 50. The clutch housing 13 also makes up a part of the housing 10.

The hydraulic clutch type speed change device 50 includes driving shaft 51 that is operatively connected to the motor shaft 31 of the hydraulic motor unit 30, driven shaft 52 that is disposed substantially in parallel with the driving shaft, a plurality of hydraulic clutches 53 that respectively have driving-side gears relatively rotatably supported on the driving shaft 51, and a plurality of driven-side gears 54 that are relatively non-rotatably supported on the driven shaft 52 in such a manner as to be respectively meshed with the driving-side gears of the plurality of hydraulic clutches 53. Thus, the speed change can be made in a stepwise manner between the driving shaft and the driven shaft.

The driving shaft 51 and the driven shaft 52 are preferably supported on the bearing plate 60.

In this embodiment, the hydraulic clutch type speed change device 50 has three-speed mechanism with three hydraulic clutches 53a–53c for first to third speed stages. Either one of these three hydraulic clutches 53a–53c is selectively brought into engaging state, so that the driven shaft 52 can produce the output in a corresponding speed stage among the three speed stages.

More specifically, the driving shaft 51 has a front portion that is operatively connected to the motor shaft 31, a rear portion that supports thereon the plurality of hydraulic clutches 53a–53c, and a middle portion located therebetween. The driving shaft 51 is relatively rotatably supported via the middle portion thereof by the bearing plate 60. The driving shaft 51 forms therein a plurality of bores whose first ends opening to the outside through a portion abutting against a supporting surface of the bearing plate 60 and second ends opening to the outside through portions respectively supporting the hydraulic clutches 53a–53c. In this embodiment, the driving shaft 51 forms four bores, of which three bores 51a–51c respectively serve as first- to third-speed hydraulic clutch lines that respectively serve as passages for the operational fluid to be supplied from the charge pump 70 to the respective hydraulic clutches 53a–53c. The residual bore 51d (see FIG. 6) forms a hydraulic clutch lubricant line that serves as a passage for lubricant to be supplied to the respective hydraulic clutches.

The transmission 1 is preferably provided with PTO power transmission shaft 55 for the power-take-off. According to the transmission 1 with the PTO power transmission shaft 55, there may be employed an arrangement where the driven shaft 52 is formed into a hollowed cylindrical body, into which the PTO power transmission shaft 55 with a first end thereof operatively connected to the rear end of the pump shaft 21 is inserted, as illustrated in FIG. 3. With this arrangement, it is possible to effectively prevent a large-sized transmission due to the equipment of the PTO power transmission shaft 55.

Figure 6:
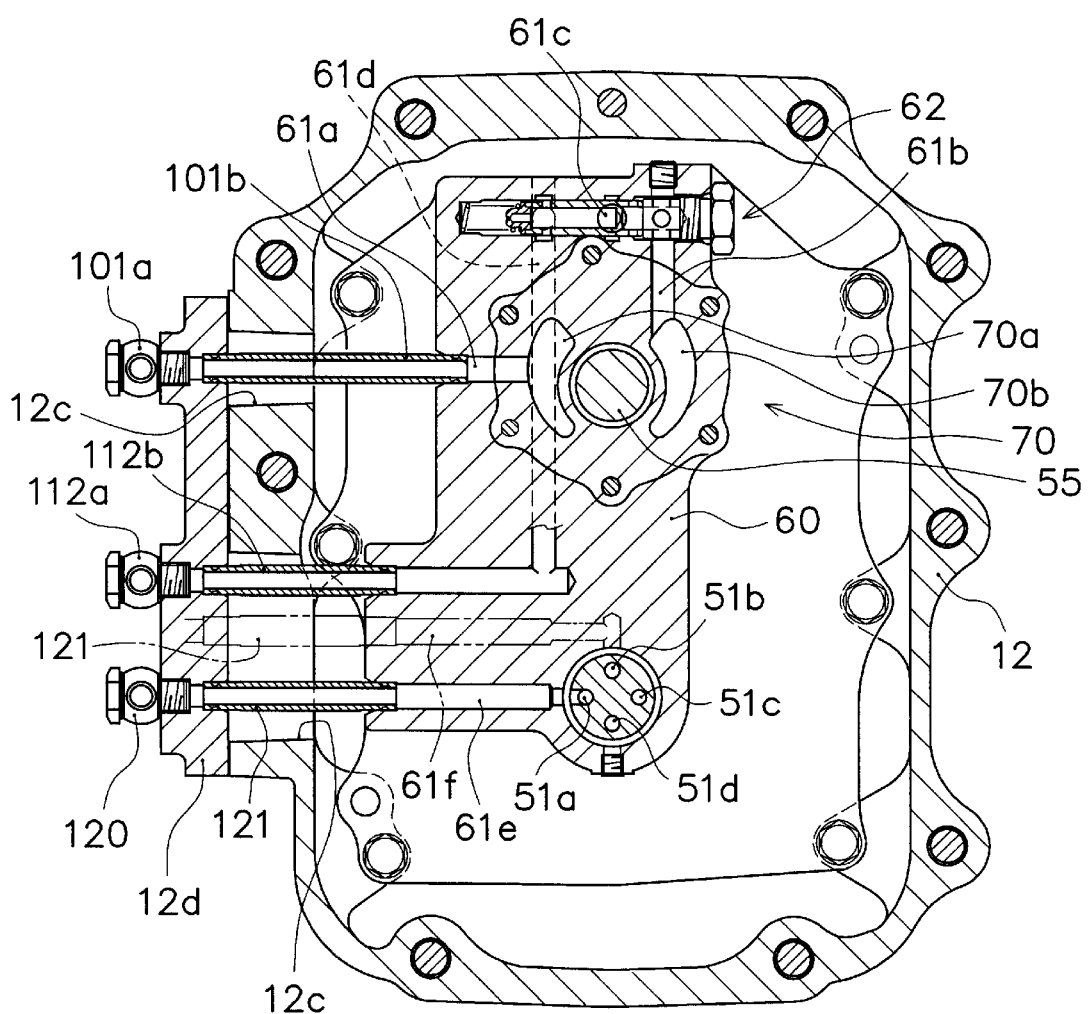
FIG. 6 is a cross-section taken along lines VI—VI in FIG. 3.

FIG. 6 is a cross-section taken along lines VI—VI in FIG. 3. As illustrated in FIGS. 3 and 6, and described above, the bearing plate 60 has a passage for replenishing the HST with operational fluid and a passage for supplying the hydraulic clutch type speed change device with operational fluid, while supporting the driving shaft 51, the driven shaft 52 and the PTO power transmission shaft 55.

The bearing plate 60 is fixed to either the intermediate housing 12 or clutch housing 13 around a joint therebetween, as illustrated in FIG. 3. In this embodiment, the clutch housing 13 has an abutting surface 13*a* to the intermediate housing 12, which surface radially and inwardly extends to provide an extension surface 13*b* to which the bearing plate 60 is fixed. However, the present invention is not necessarily limited to this embodiment. Rather, various embodiments can be applied. That is, a radially inwardly extending rib may integrally or separately be provided on the inner periphery of the clutch housing 13 to provide a fixing surface to which the bearing plate is fixed. Further, as an alternative to the arrangement with the bearing plate 60 fixed to the clutch housing 13, the bearing plate 60 may be fixed to the intermediate housing 12.

As best illustrated in FIG. 3, the transmission 1 is designed so that with the intermediate housing 12 and the clutch housing 13 connected together, the bearing plate 60 is enclosed by the enclosing member made up of both housings.

That is, in this embodiment, the bearing plate 60 is entirely accommodated within the enclosing member made up of both housings without getting involved with the connection between the intermediate housing 12 and the clutch housing 13.

With the above arrangement, the bending stress acting on the vehicle body frame is unlikely to reach the bearing plate 60 even if the intermediate housing 12 and the clutch housing 13 serve as parts of the vehicle body frame. Therefore, it is not necessary to form the bearing plate 60 with stiffness increased to such an extend as to render the bearing plate tolerable against the bending stress. In other words, it is enough to form the bearing plate 60 so that it can support the driving shaft 51, the driven shaft 52 and the PTO power transmission shaft 55, and be tolerable against the maximum pressure of the pressurized fluid flowing in each of the passages formed in the bearing plate 60. Thus, the manufacturing cost of the bearing plate can be lowered. Also, the bending stress is unlikely to be applied on the driving shaft 51, the driven shaft 52 and the PTO power transmission shaft 55 supported by the bearing plate 60, so that malfunctions or the like of the hydraulic clutch type speed change device 50 or the PTO power transmission mechanism can effectively be prevented.

Reference numerals 81 in FIG. 1 represents a motor-shaft direct connection clutch for transmitting the output of the motor shaft 31 to the output shaft 82 in the event of malfunction of the hydraulic clutch type speed change device 50. Also, reference numerals 83, 84, and 56 respectively represent a parking brake for stopping the rotation of the output shaft, power take-off shaft for the front wheels, to which the drive power branched from the output shaft 82 is transmitted, and a PTO shaft operatively connected to the PTO power transmission shaft.

Now, the description will be made for the hydraulic circuit of the transmission 1. Again, FIG. 6 is the cross-section taken along lines VI—VI in FIG. 3. As illustrated in FIGS. 2 and 6, the bearing plate 60 forms therein first bore 61*a* having a first end opening through the outer periphery of the bearing plate 60 and a second end communicated with inlet port 70*a* of the charge pump 70. The first bore 61*a* serves as a part of inlet line 101 for connection between hydraulic fluid tank 100 and the charge pump 70 (see FIG. 2). In this embodiment, the intermediate housing 12 forms in its side wall, open end 12*c* opening to the above and below. Cover 12*d* for covering the open end 12*c* is provided with inlet joint 101*a*. Hydraulic fluid filter 100*a* (see FIG. 2) is disposed on a bottom portion of the clutch housing 13 that also serves as the hydraulic fluid tank 100, and connected to an outer end of the inlet joint 101*a* via hydraulic fluid conduit (not shown). An inner end of the inlet joint 101*a* is connected to the first end of the first bore 61*a* via hydraulic fluid conduit 101*b* with the open end 12*c* inserted thereinto (see FIG. 6).

As illustrated in FIGS. 2 and 6, the bearing plate 60 also forms therein second bore 61*b* having a first end communicating with outlet port 70*b* of the charge pump 70, and third and fourth bores 61*c*, 61*d* branched from the second bore 61*b* at its second end. Flow divider 62 is preferably provided between the second end of the second bore 61*b*, and the third and fourth bores 61*c*, 61*d*. A flow divider used as the flow divider 61 in this embodiment has a relief valve function for setting the hydraulic pressure of the third bore 61 and a throttle valve function for regulating the volume of the hydraulic fluid delivered to the fourth bore 61*d*. It is a matter of course that a flow divider of any other type having a different function and/or additional function can be used.

As illustrated in FIGS. 2 and 3, the third bore 61*c* serves as a part of HST operational fluid supply line 102 for supplying the operational fluid from the charge pump 70 to the HST, while the fourth bore 61*d* serves as a part of operational fluid supply line 112 for supplying the operational fluid from the charge pump 70 to the hydraulic clutch type speed change device 50. With this arrangement, the hydraulic fluid discharged from the common discharge pump is supplied to both the HST and the hydraulic clutch type speed change device, so that a number of charge pumps and manufacturing costs can be reduced.

Now, the description will be made for the operational fluid supply line 112 for the hydraulic clutch type speed change device. As illustrated in FIG. 2, the operational fuel supply line 112 is branched to main line 14 for switching the hydraulic clutch and hydraulic clutch lubrication line 115 via delay relief valve 113. The delay relief valve 113 is provided for gradually increasing the hydraulic pressure in the clutch switching main line 114 at the time of changing the speed of the hydraulic clutch type speed change device. Whereby, the engagement by a following hydraulic clutch gradually proceeds, so that speed changing shock, excessive wear of a clutch plate and the like due to the speed changing operation can be prevented.

The clutch switching main line 114 is connected to first- to third-speed hydraulic clutch lines 117*a*–117*c* via hydraulic clutch switching valve 116. The first- to third-speed hydraulic clutch lines 117*a*–117*c* respectively have rear ends communicated with the first- to third-speed hydraulic clutches 53*a*–53*c*. Drain line 118 is connected to the upstream end of the clutch switching valve 116. That is, the clutch switching main line 114 is selectively communicated with either one of the first- to third-speed hydraulic clutch lines 117*a*–117*c*, whereby only the hydraulic clutch connected to the either one of the clutch lines 117*a*–117*c* communicated with the clutch switching main line 114 is brought into engaging state, while the residual two hydraulic clutch lines are communicated with the drain line 118, so that hydraulic clutches connected to the residual two hydraulic clutch lines are brought into disengaging state.

On the other hand, the lubrication line 115 is designed to supply the respective clutches with the hydraulic fluid as lubricant whose hydraulic pressure has been set at a predetermined value by the relief valve 119.

In this embodiment, the fourth bore 61d that serves as a part of the operational fluid supply line 112 for the hydraulic clutch type speed change device has a second end opening through the outer periphery of the bearing plate 60 (see FIG. 6). The cover 12d mounted on the side wall of the intermediate housing 12 is provided with joint 112a for supplying the operational fluid to the hydraulic clutch type speed change device. The joint 112a communicates with the second end of the fourth bore 61d via hydraulic fluid conduit 112b with the open end 12c formed in the second housing 12 inserted thereinto. The fourth bore 61, the hydraulic fluid conduit 112b and the joint 112a together make up the operational fluid supply line 112 for the hydraulic clutch type speed change device.

The joint 112a for supplying the operational fluid to the hydraulic clutch type speed change device has an outer end connected to a hydraulic fluid conduit (not shown in FIG. 6), which is branched to a hydraulic fluid conduit (not shown in FIG. 6) constituting the clutch switching main line 114 and a hydraulic fluid conduit (not shown in FIG. 6) serving as the lubrication line 115 via the delay relief valve 113.

The hydraulic fluid conduit that constitutes the main line 114 is connected to hydraulic fluid conduits (not shown in FIG. 6) that respectively constitutes the first- to third-speed hydraulic clutch lines 117a–117c. The hydraulic fluid conduits that constitutes the first- to third-speed hydraulic clutch lines 117a–117c are in turn connected respectively to outer ends of joints 120a–120c for the first- to third-speed hydraulic clutch lines 117a–117c. These joints 120a–120c, of which only one joint is illustrated in FIG. 6, are disposed on the cover 12d of the intermediate housing 12.

On the other hand, the hydraulic fluid conduit that constitutes the lubrication line 115 is connected to an outer end of a joint (not shown in FIG. 6) for the lubrication line via the relief valve 119, which joint is disposed on the cover 12d of the intermediate housing 12 (not shown in FIG. 6).

The bearing plate 60 also forms therein fifth to eighth bores 61e–61h each having a first end opening through the outer periphery and a second end opening through a bearing surface that supports thereon the driving shaft. Of the bores 61e–61h, two bores 61e, 61f only are illustrated in FIG. 6. The fifth to eighth bores 61e–61h respectively have first ends connected to inner ends of the joints 120a–120c for the first- to third-speed hydraulic clutch lines and the joint for the lubrication line via hydraulic fluid conduit 121. The fifth to eighth bores 61e–61h also respectively have second ends adapted to be connected to four bores 51a–51d via four annular grooves formed on the outer periphery of the driving shaft 51. The operational fluid supply line 112 for the hydraulic clutch type speed change device is thus formed.

Now, the description will be made for the HST operational fluid supply line 102. As illustrated in FIG. 2, the supply line 102 is branched to HST charge line 104 and operational fluid supply line 105 for the hydraulic servo mechanism via relief valve 103 for setting the charge pressure.

Figure 7:
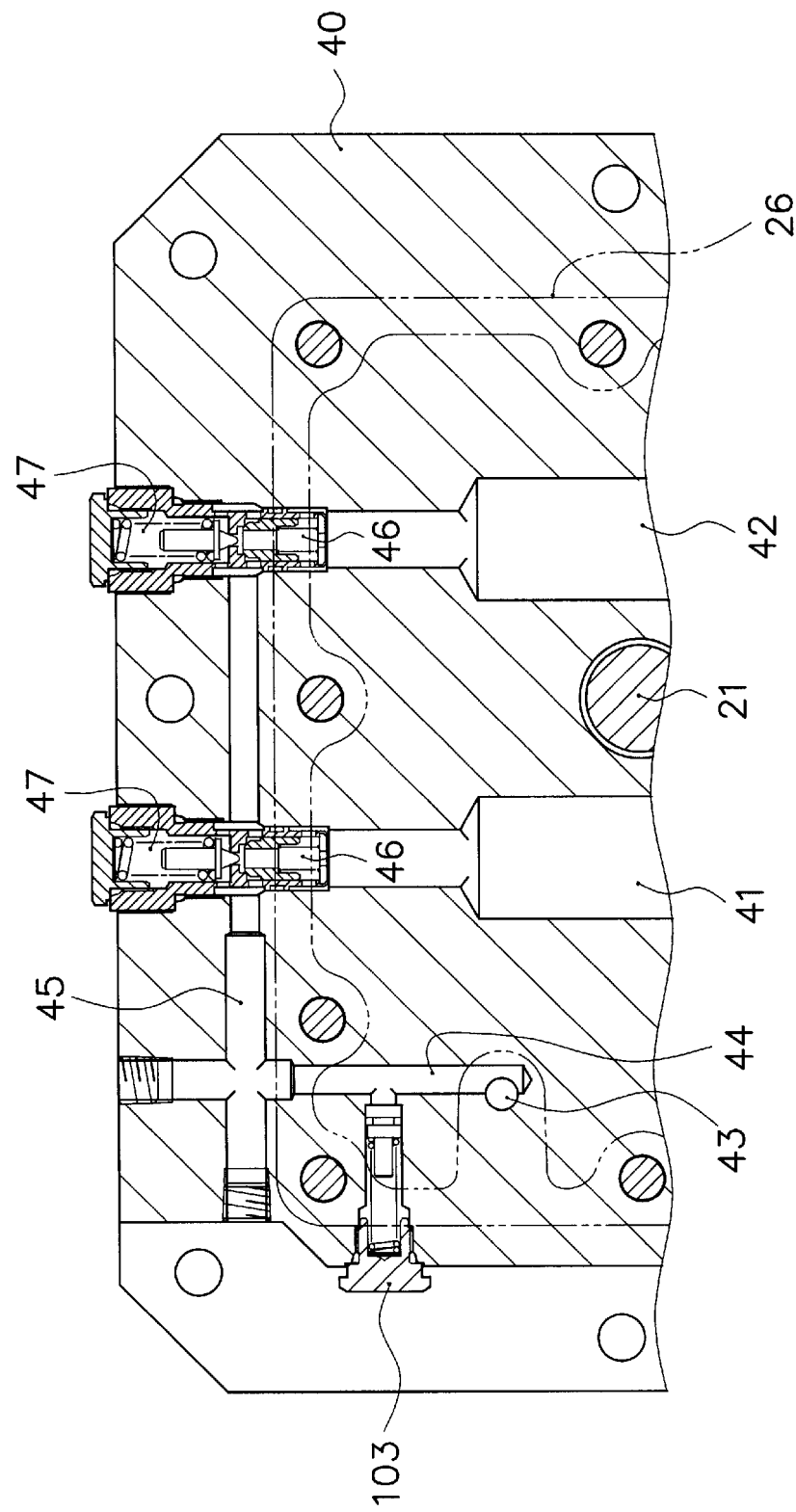
FIG. 7 is a cross-section taken along lines VII—VII in FIG. 4.

FIG. 7 is a cross-section taken along lines VII—VII in FIG. 4. As illustrated in FIG. 7, the center section 40 forms therein a hydraulic circuit that fluidly connects the hydraulic pump unit 20 with the hydraulic motor unit 30, thus forming a closed circuit that includes both units. In this embodiment, a pair of hydraulic lines 41, 42 are employed as the hydraulic circuit. The center section 40 also forms therein common line 43 that has a first end opening through the outer surface of the center section 40, and first and second charge lines 44, 45 that are branched from the common line 43 at its second end. The second charge line 45 has a second end communicated with the pair of hydraulic lines 41, 42 respectively via check valves 46 that are adapted to permit the inflow of the pressurized hydraulic fluid from the second charge line 45 to the pair of hydraulic lines 41, 42, while preventing the outflow of the pressurized hydraulic fluid in the reverse direction. It is preferable to provide between the second charge line 45 and the pair of hydraulic lines 41, 42 bypass lines with high pressure relief valves 47 interposed therein, as illustrated in FIG. 2 and the other Figures. These bypass lines are adapted to permit the inflow of the pressurized hydraulic fluid from the pair of hydraulic lines 41, 42 to the second charge line 45 when the hydraulic pressure in the pair of the hydraulic lines 41, 42 exceeds a predetermined pressure level.

As illustrated in FIG. 3 and the other Figures, the first open end of the common line 43 is communicated with the second open end of the third bore 61c in the bearing plate 60 via hydraulic fluid conduit 102a for the HST operational fluid supply line.

Specifically, in this embodiment, the third bore 61c in the bearing plate 60, the hydraulic fluid conduit 102a for the HST operational fluid supply line, the common line 43, and the first and second charge lines 44, 45 in the center section 40 together make up the HST charge line 104.

The third bore 61c in the bearing plate 60, the hydraulic fluid conduit 102a for the HST operational fluid supply line and the common line 43 in the center section 40 together make up a part of the operational fluid supply line 105 for the hydraulic servo mechanism.

Figure 8:
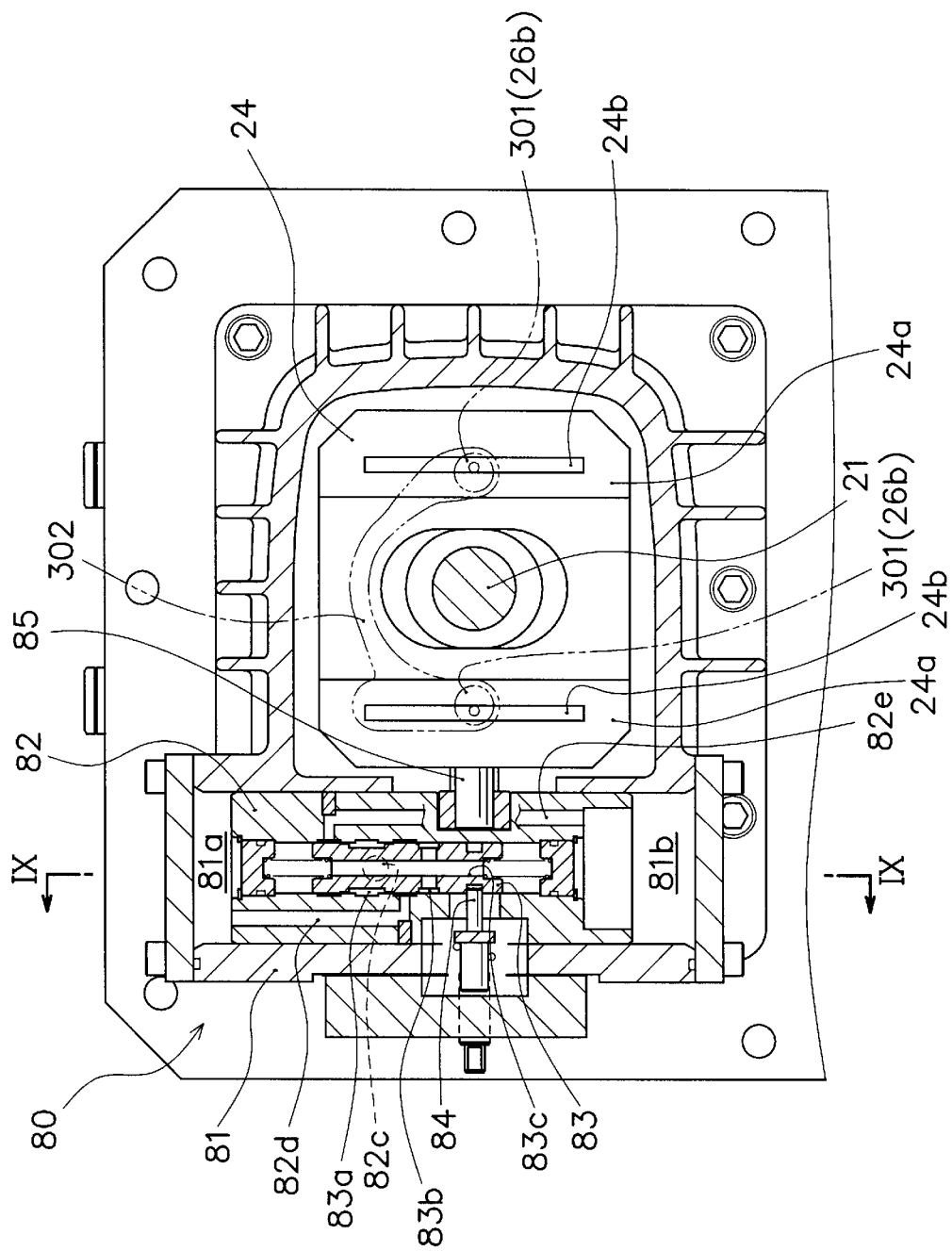
FIG. 8 is a cross-section taken along lines VIII—VIII in FIG. 5.
Figure 9:
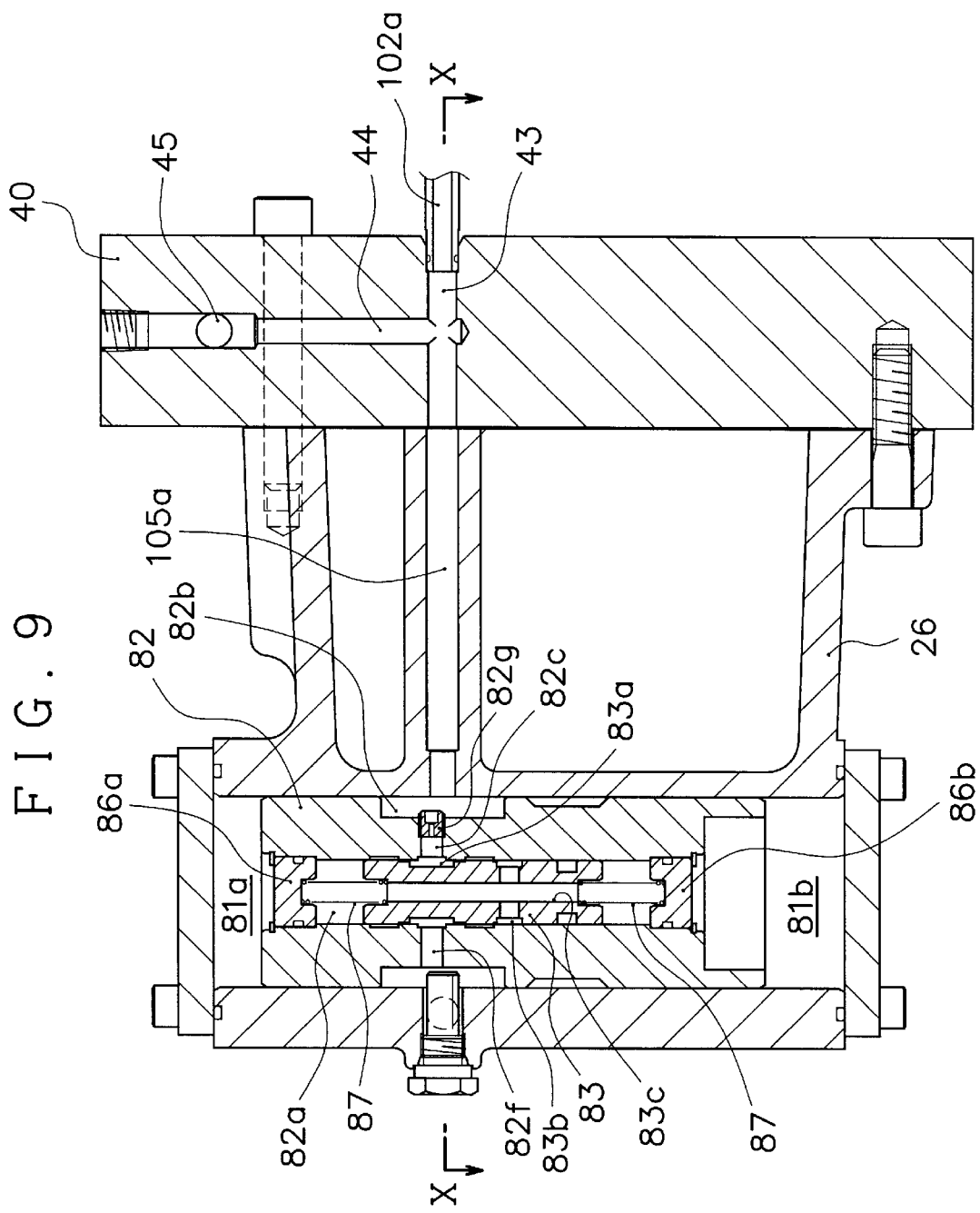
FIG. 9 is a cross-section taken along lines IX—IX in FIG. 8.

Now, the description will be made for the hydraulic servo mechanism 80. In this embodiment, the hydraulic servo mechanism is employed to slantingly move the movable swash plate of the HST, as described above. The hydraulic servo mechanism 80 is designed to amplify the operating physical force by the operator by utilizing the hydraulic pressure, and therefore is effective particularly for a large-sized HST. FIGS. 8 and 9 are respectively cross-sections taken along lines VIII—VIII in FIG. 5 and IX—IX in FIG. 8.

As illustrated in FIGS. 8 and 9, the hydraulic servo mechanism 80 includes cylinder case 81 formed in a side wall of pump case 26, servo piston 82 that is axially slidably accommodated within the cylinder case 81, directional control valve 83 that is axially slidably accommodated within axially extending hole 82a formed in the servo piston 82, and operation rod 84 that has an inner end connected to the directional control valve 83 and an outer end extending to the outside of the cylinder case 81 through the servo piston 82.

The servo piston 82 is accommodated within the cylinder case 81 in a fluid-tight manner, thereby defining first hydraulic fluid chamber 81a and second hydraulic fluid chamber 81b on both sides of the cylinder case 81 along the axis thereof. The servo piston 82 is operable in association with the movable swash plate 24, as illustrated in FIGS. 5 and 8. In this embodiment, the servo piston 82 and the movable swash plate 24 are connected together via connection rod 85. With this arrangement, the swash plate 24 is slantingly moved along a recessed circular surface of the support block 25 in response to the axial sliding of the servo piston 82.

The servo piston 82 forms substantially along its axial center a fluid receiving part for receiving the pressurized hydraulic fluid from the common line 43. In this embodiment, axially extending groove 82 that is formed substantially along the axial center of the outer surface of the servo piston 82 acts as the fluid receiving part, as illustrated in FIG. 9. The groove 82b and the common line 43 are communicated with each other via hydraulic fluid passage 105a formed in a side wall of the pump case 26. The servo piston 82 also forms therein inlet port 82c that communicates the fluid receiving part 82b with the axially extending bore 82b. The servo piston 82 forms therein first and second hydraulic fluid passages 82d, 82e that respectively have first ends communicated with the axial extending hole 82a and second ends respectively communicated with the first and second hydraulic fluid chambers 81a, 81b.

The directional control valve 83 is accommodated within the axially extending hole 82a of the servo piston 82 in fluid tight and slidable manner. The axially extending hole 82a of the servo piston 82 has the opposite ends that are covered by lid members 86a, 86b after the directional control valve 83 is placed in the hole 82a. Biasing members 87 are respectively interposed between the two lid members 86a, 86b and the directional control valve 83. With this arrangement, the directional control valve 83 lies substantially at the center of the axially extending hole 82a of the servo piston 82 in a neutral state where the operating physical force is not applied to the directional control valve 83 from the outside. The axially extending hole 82a is opened to the inside of the pump case 26 (not shown).

The directional control valve 83 forms on its outer periphery first hydraulic fluid pocket part 83a for receiving the pressurized hydraulic fluid from the inlet port 82c. The first hydraulic fluid pocket part 83a is adapted to bring the inlet port 82c into communication with either one of the first and second hydraulic passages 82d, 82e, while shutting off the communication between the inlet port 82c and the residual one of the first and second hydraulic passages 82d, 82e, when the directional control valve 83 slides towards one side along its axial direction.

In this embodiment, a circumferentially extending annular groove is formed on the outer periphery of the directional control valve 83 around a position where it faces the inlet port in the neutral state. This annular groove enables the inlet port 82c to be brought into fluid communication with either one of the first and second hydraulic fluid passages 82d, 82e when the directional control valve has been slid to one side along its axial direction.

An annular groove as second hydraulic fluid pocket part 83b is formed on the outer periphery of the directional control valve 83 to be positioned adjacent to the first hydraulic fluid pocket part 83a, and communicated with axially extending hole 83c of the directional control valve 83. The axially extending hole 83c is in turn opened through an end surface of the directional control valve 83 for constant communication with the axially extending hole 82a.

The hydraulic servo mechanism having the above arrangement acts in the manner stated below.

When sliding the directional control valve 83 from the neutral state to the one side along the axial direction via the operation rod 84, the pressurized hydraulic fluid from the inlet port 82c is correspondingly supplied to either one of the first and second hydraulic fluid chambers 81a, 81b via the first hydraulic fluid pocket 83a. Whilst, the residual one of the first and second hydraulic fluid chambers 81a, 81b is opened to the inside of the pump case 26 via the second hydraulic fluid pocket part 83b and the axially extending holes 83c, 82a. Whereby, the servo piston 82 moves to the one side in the axial direction. This axial movement of the servo piston 82 does not cause the movement of the directional control valve 83 since it is connected to the operation rod 84. That is, the directional control valve 83 is first moved by the operation of the operation rod, and then only the servo piston is moved to the one side along the axial direction in response to the movement of the directional control valve.

The movement of the servo piston causes the slanting movement of the movable swash plate 24 connected to the servo piston via the connection rod 85, while shutting off the communication between the inlet port 82c and either one of the first and second hydraulic fluid passages 82d, 82e. Accordingly, the servo piston 82 slides by a predetermined stroke and then held at its position. According to the servo mechanism 80, the movable swash plate 24 is slantingly moved by a distance corresponding to the moving distance of the directional control valve 83 (operating distance of the operation rod 84).

The inlet port 82c is preferably provided with throttle valve 82g, as illustrated in FIG. 9. The throttle valve 82g is adapted to adjust the time lag between the operation of the operation rod and actual initiation of the movement of the servo piston 82. That is, when desiring a less time lag, the throttle valve having a large throttle diameter is employed.

Figure 10:
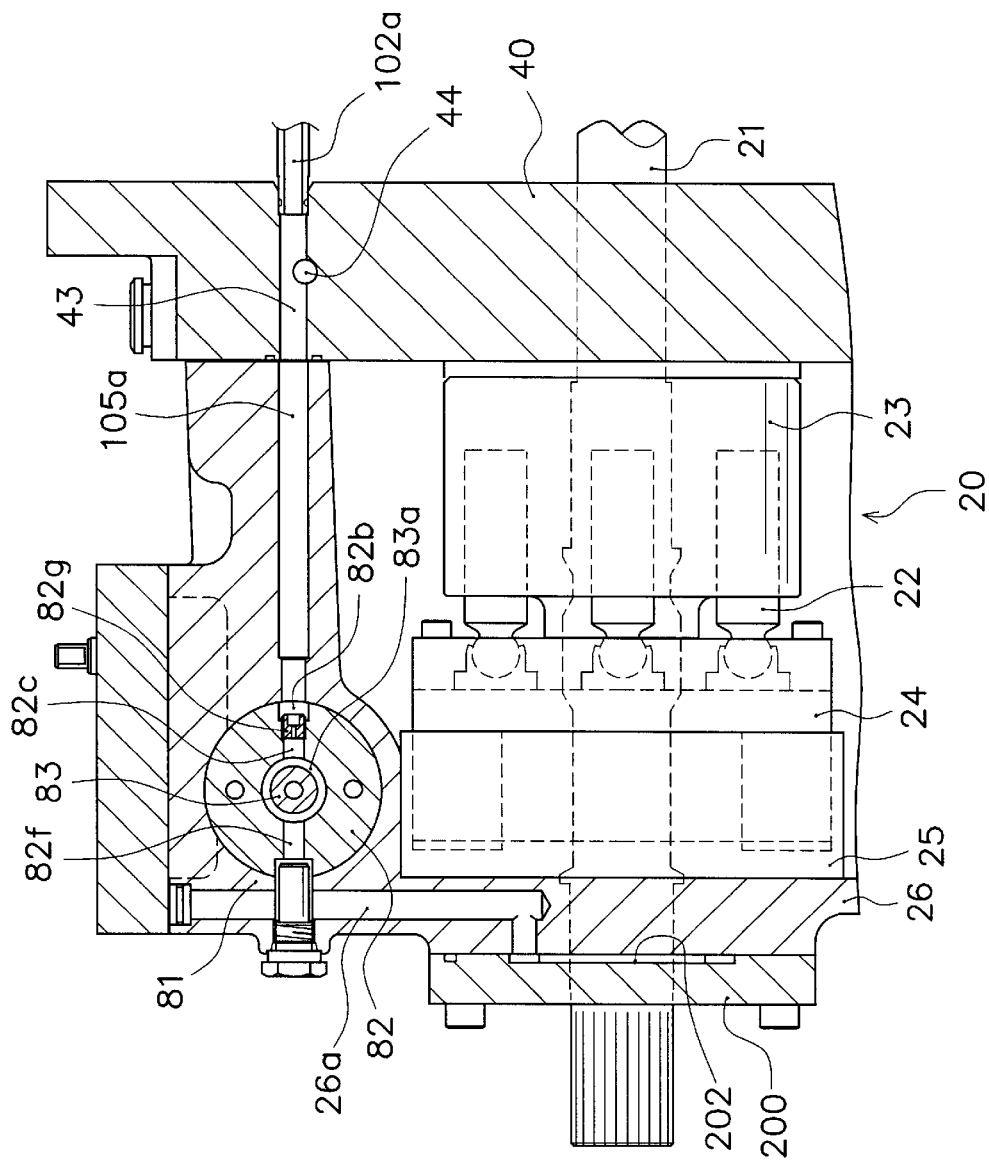
FIG. 10 is a cross-section taken along lines X—X in FIG. 9.

More preferably, the operational fluid for the hydraulic servo mechanism is partly used as lubricant for the swash plate. FIG. 10 is a cross-section taken along lines X—X in FIG. 9.

As illustrated in FIGS. 9 and 10, in this embodiment, the servo piston 82 forms therein communication hole 82f that has an inner end communicated with the first hydraulic fluid pocket part 83a of the directional control valve 83 and an outer end opening through the outer periphery of the servo piston 82. The pump case 26 forms therein hydraulic fluid passage 26a that has a first end communicated with the outer end of the communication hole 82f and a second end opening to a joint surface of seal cover 300 that is adapted to seal the outer surface of a pump shaft extending through a front wall of the pump case 26. On the other hand, pair of recessed circular surfaces 24a in the movable swash plate 24 respectively have hydraulic fluid grooves 24b extending along the moving direction of the swash plate. The support block 25 forms therein two hydraulic fluid holes 301 that respectively have first ends opening through a joint surface to the swash plate, respectively facing the hydraulic fluid grooves 24b, and second ends opening through a joint surface to the seal cover 300. The second ends of the two hydraulic fluid passages 301 are communicated with the hydraulic fluid passage 26a via hydraulic fluid groove 302 formed at the joint interface between the pump case 26 and the seal cover 300, so that the operational fluid for the HST servo mechanism is partly supplied on slidingly contacting surfaces between the movable swash plate 24 and the swash plate support block 25.

As illustrated in FIGS. 2 and 5, the hydraulic fluid passage 301 may be provided with check valve 26b for preventing the reverse flow of the lubricant. The lubrication line for the movable swash plate can effectively prevent a fluid film lacking portion at the interface between the swash plate 24 and the swash plate support block 25, and hence achieve improved efficiency in slanting movement of the swash plate 24 in the high load operation.

Figure 11:
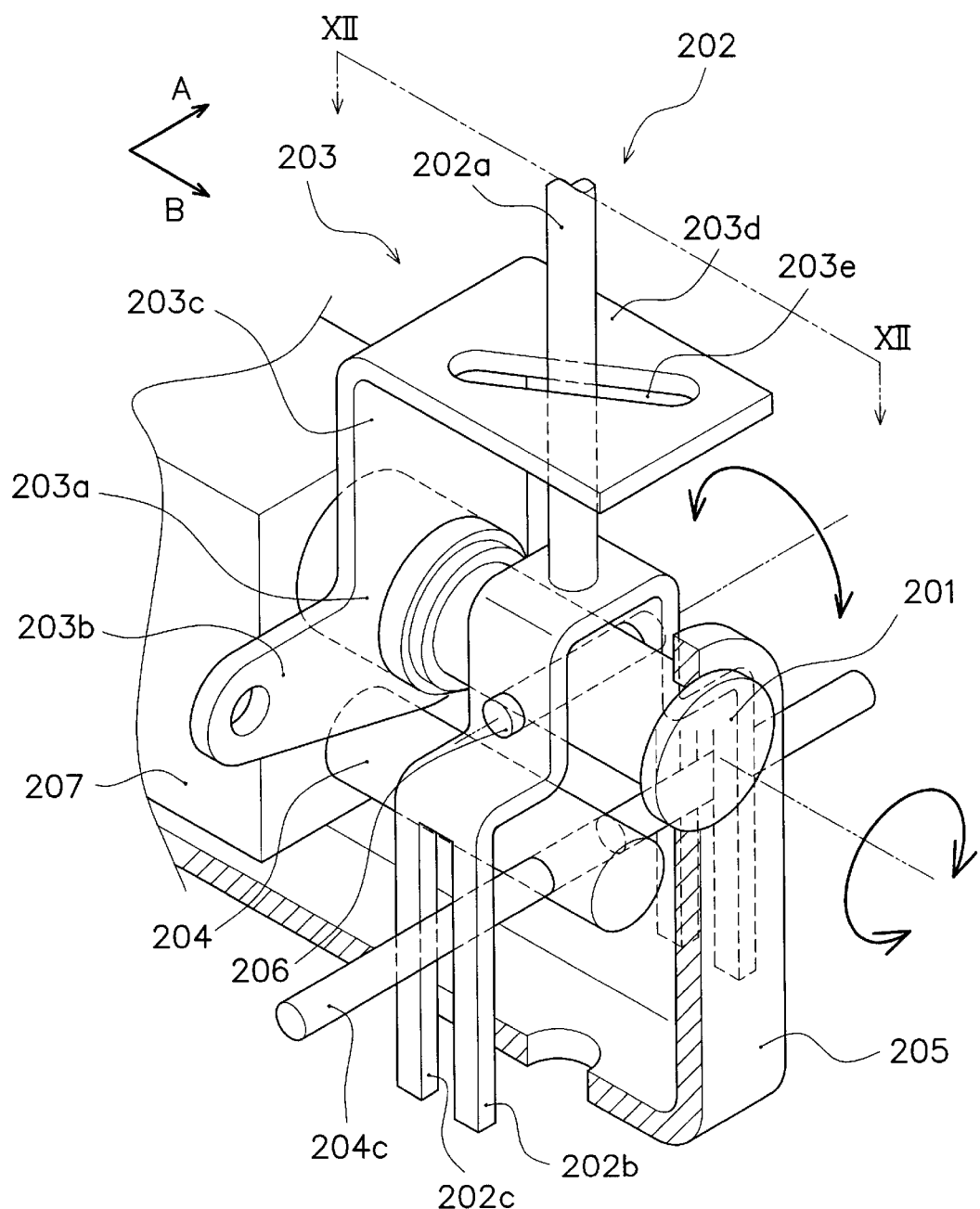
FIG. 11 is a perspective view of a speed change operation mechanism used in the transmission of FIG. 1.

Lastly, the description will be made for speed change operation mechanism 200 for the hydraulic clutch type speed change device and the HST unit. The speed change operation mechanism 200 is designed to enable mechanical operation of both the clutch switching valve 116 of the hydraulic clutch type speed change device 50 and the operation rod 84 for slantingly moving the swash plate 24 of the HST unit. FIG. 11 is a perspective view of the speed change operation mechanism 200, and FIG. 12 is a cross-section taken along lines XII—XII in FIG. 11.

Figure 12:
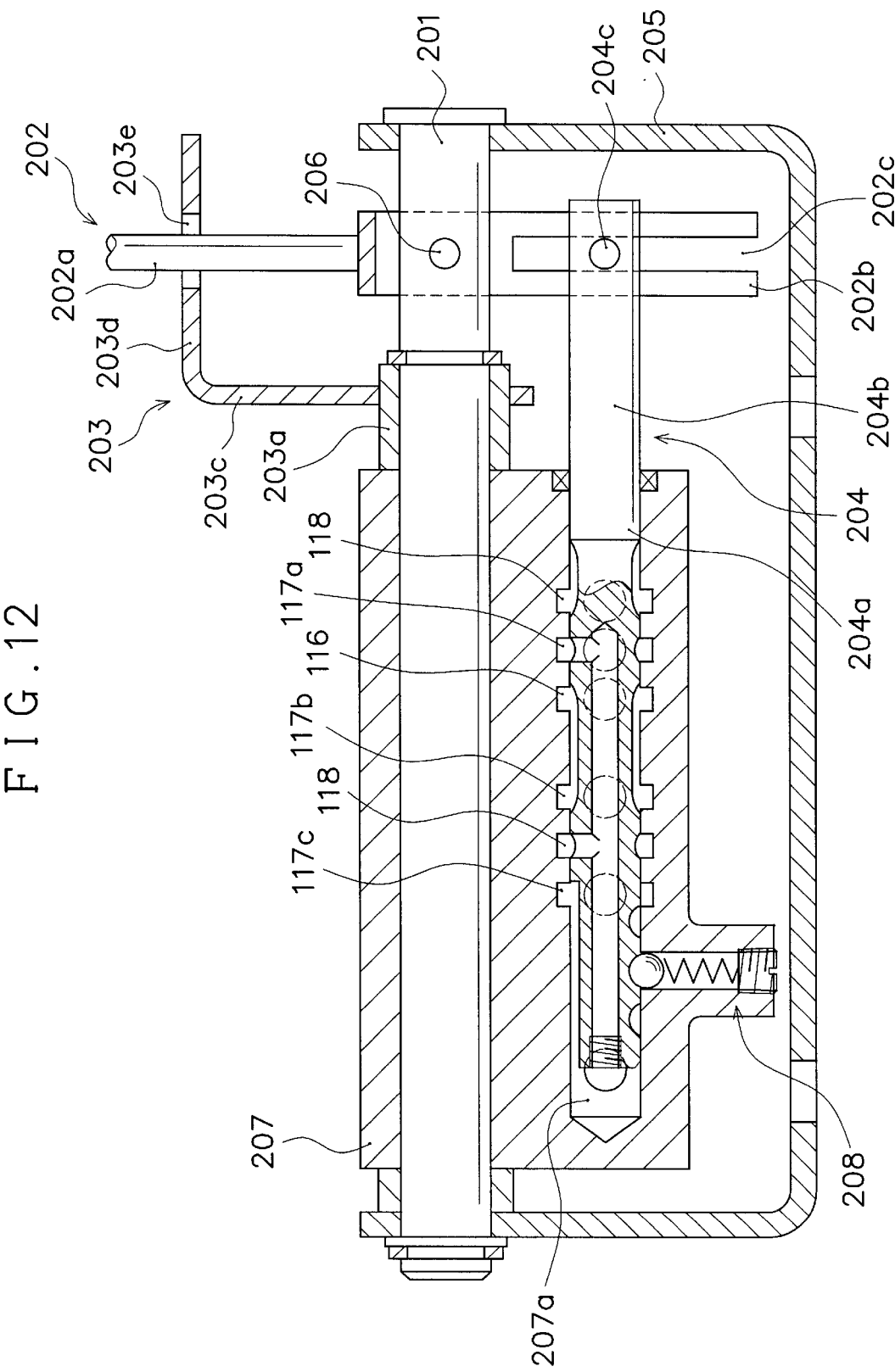
FIG. 12 is a cross-section taken along lines XII—XII in FIG. 11.

As illustrated in FIGS. 11 and 12, the speed change operation mechanism 200 includes support shaft 201, speed change lever 202 supported on the support shaft 201, HST swash plate control arm 203 that is relatively rotatably and axially non-slidably supported on the support shaft 201, and clutch switching spool 204 that is disposed parallel with the support shaft 201 and is designed to move in the axial direction by the control arm 203.

The support shaft 201 is supported to a vehicle body frame or the like in such a manner as to be relatively rotatable around the axis. In the embodiment illustrated in FIG. 11, the speed change operation mechanism 200 also includes mounting stay 205 to be mounted on the vehicle body frame. The support shaft 201 is supported on the mounting stay 205 in such a manner as to be relatively rotatable around the axis and axially non-slidable.

The speed change lever 202 is supported on the support shaft 201 via pivoting shaft 206 orthogonal to the support shaft 201. More specifically, the speed change lever 202 is supported on the support shaft 201 via the pivoting shaft 206 so that it is pivotally movable around the pivoting shaft 206 and relatively non-rotatable around the axis of the support shaft 201. The speed change lever 202 has first portion 202*a* and second portion 202*b* that are respectively positioned above and below the pivoting shaft 206.

The HST swash plate control arm 203 includes base portion 203*a* that is relatively rotatably and axially non-slidably supported on the support shaft 201, connection portion 203*b* that radially outwardly extends from the base portion 203*a*, extending portion 203*c* that radially outwardly extends from the base portion 203*a*, and engaging portion 203*d* that extends from the extending portion 203*c* in the axial direction of the support shaft 201.

The engaging portion 203*d* forms therein slit 203*e* into which the first portion 202*a* of the speed change lever 202 is engagingly inserted. The slit 203*e* obliquely extends at a predetermined angle from the axial direction of the support shaft 201 towards the axial direction of the pivoting shaft 206. The predetermined angle may for example be in the range between 20 and 70 degrees, and preferably 40 and 50 degrees.

The connection portion 203*b* is connected via a suitable power transmission mechanism to the operation rod 84 for operating the movable swash plate 24. As illustrated in FIG. 5, in this embodiment, the power transmission mechanism includes pivotally moving arm 211 that supports on its free end the operation rod 84, control shaft 212 that relatively non-rotatably supports a proximal end of the pivotally moving arm 211, control arm 213 that has a proximal end relatively non-rotatably supported on the control shaft 212, and a member (not shown) for connection between the control arm 213 and the connection portion 203*b*. With this arrangement, the operation rod 84 is pivotally moved according to the moving distance of the connection portion 203*b* around the axis of the support shaft 201. In FIG. 5, numeral references 214 and 215 respectively represent eccentric pin for adjusting the neutral position of the HST movable swash plate, and a neutral position return spring that biases the pivotally moving arm 211 to the neutral position.

The clutch switching spool 204 forms the hydraulic clutch switching valve 116 of the hydraulic clutch type speed change device 50. As illustrated in FIGS. 11 and 12, the spool 204 is axially slidably supported on support block 207 that forms therein the main line 114, the first- to third-speed hydraulic clutch lines 117*a*–117*c* and the drain line 118 of the hydraulic clutch type speed change device 50 (see FIG. 2). The communication/shutting-off of the respective lines can thus be performed by varying the axial position of the spool 204 with respect to the support block 207.

Specifically, the support block 207 forms therein communication hole 207*a* that is communicated with all of the main line 116, first- to third-speed hydraulic clutch lines 117–117*c* and drain line 118.

The spool 204 has insertion portion 204*a* that is inserted into the communication hole 207*a* of the support block 207, and outer portion 204*b* that is positioned outside of the support block 207.

The insertion portion 204*a* forms therein a hydraulic fluid passage that is adapted to communicate the main line 114 with either one of the first- to third-speed hydraulic clutch lines 117*a*–117*c*, and communicate the residual two lines of the first- to third-speed hydraulic clutch lines 117*a*–117*c* with the drain line 118 based upon the relative position of the spool 24 with respect to the support block 207.

On the other hand, the outer portion 204*b* is provided with an engaging member engageable with the second portion 202*b* of the speed change lever 202. In this embodiment, the second portion 202*b* of the speed change lever 202 forms therein slit 202*c*, and engaging rod 204*c* engagingly insertable in the slit 202*c* is provided on the outer portion 204*b*.

Accordingly, as illustrated in FIGS. 13(*a*)–13(*c*), the pivotal movement of the speed change lever 202 around the pivoting shaft 206 causes the axially sliding movement of the spool 204, so that according to the relative position of the spool 204 to the support block 207, the main line 116 is communicated with either one of the first- to third-speed hydraulic clutch lines 117*a*–117*c*, while the residual two lines are communicated with the drain line 118. FIGS. 13(*a*)–13(*c*) respectively illustrate the main line 116 communicated with the first- to third-speed hydraulic clutch lines 117*a*–117*c*. In FIGS. 12 and 13, reference numeral 208 represents detent mechanism for preventing unintentional movement of the spool 204.

The thus arranged speed change operation mechanism 200 acts in the manner stated below.

Since the swash plate control arm 203 is connected to the speed change lever 202 via the slit 203*e* of the engaging portion 203*d*, the HST swash plate control arm 203 is pivotally moved in response to the pivotal movement of the speed change lever 202 around the axis of the support shaft 201 (A direction in FIG. 11). As described above, the swash plate control arm 203 is operatively connected to the operation rod 84 that slantingly moves the HST movable swash plate 24. Accordingly, the control rod 84 is pivotally moved in response to the pivotal movement of the swash plate control arm 203, thereby causing the slanting movement of the swash plate 24. With this speed change operation mechanism 200, the pivotal movement of the speed change lever 202 around the axis of the support shaft 201 thus causes the slanting movement of the movable swash plate 24 in proportion to the moving distance of the swash plate control arm 203 that is operated in association with the speed change lever 202.

Now, the description will be made for the upshifting operation of the hydraulic clutch type speed change device 50 by taking for example the case where the upshifting operation will be initiated with the hydraulic clutch type speed change device 50 engaged with the first speed. The speed change lever 202 is pivotally moved around the axis of the support shaft 201, thus slanting the movable swash plate 24 to the maximum slanting angle. From this position, the speed change lever 202 is pivotally moved around the pivoting shaft 206 (direction indicated by arrow B in FIG. 11), causing the axial movement of the spool 204. Hence, the hydraulic clutch type speed change device 50 is brought into engagement with the second speed. Along with this engaging action, the HST swash plate control arm 203 is pivotally moved in the reverse direction to the arrow A in FIG. 11 by camming action of the slit 203e in the engaging portion 203d that is engaged with the first portion 202a of the speed change lever.

The description will be made for the operation in more detail with reference to FIGS. 14(a)–14(c) that are plan views illustrating the positional relationship between the first portion 202a of the speed change lever 202 and the engaging portion 203d of the HST swash plate control arm 203. In these Figures, arrows A and B indicate the same directions as the arrows A and B in FIG. 11.

Figure 14:
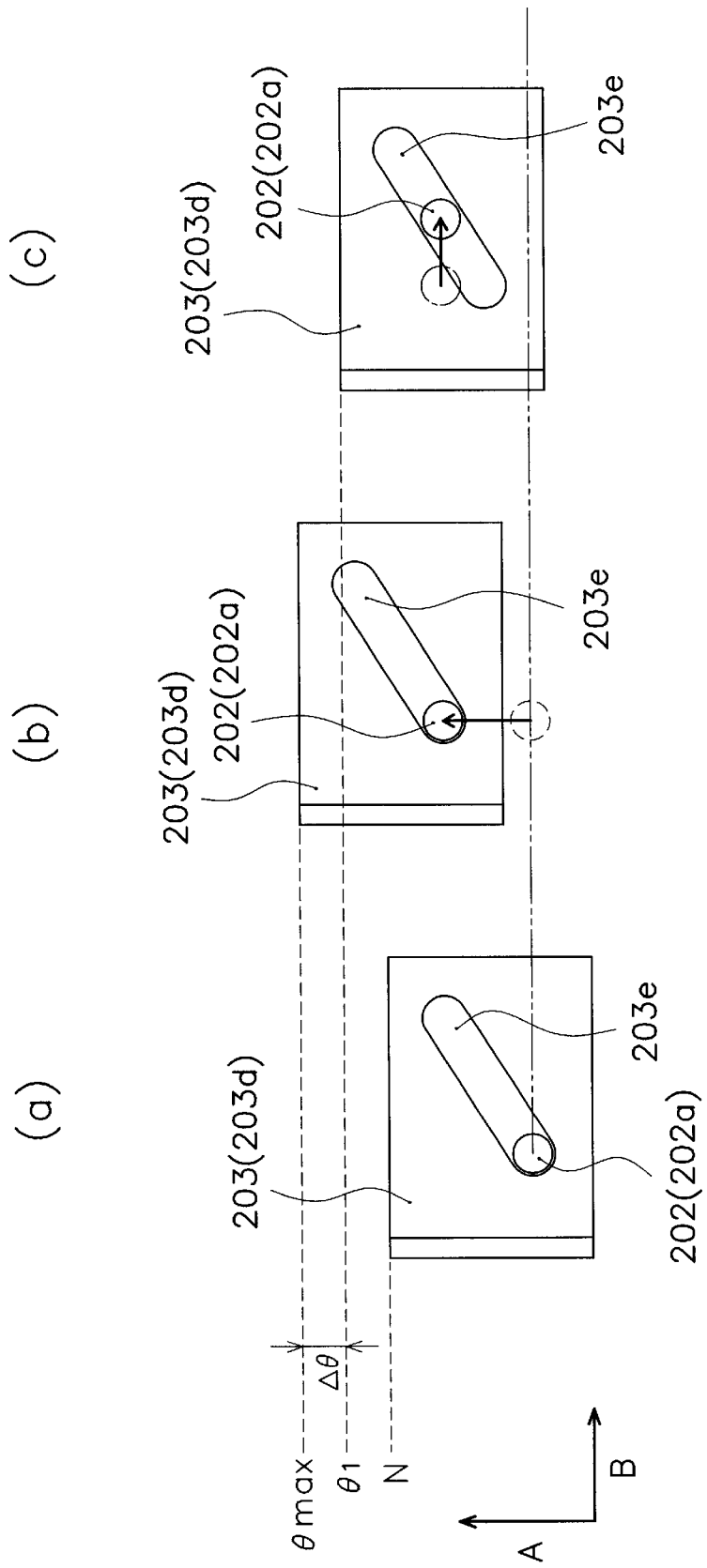
FIG. 14 are plan views each illustrating a positional relationship between a speed change lever and a swash plate control arm in the speed change operation mechanism of FIGS. 11 and 12. Specifically, FIGS. 14(a)–14(c) respectively illustrate positional relationships between the speed change lever and the swash plate control arm in a state with the hydraulic clutch type speed change device engaging with the first speed and a swash plate of the HST lying at a neutral position, a state with the hydraulic clutch type speed change device engaging with the first speed and the swash plate of the HST lying at the maximum slanting position, and a state with the hydraulic clutch type speed change device upshifted to the second speed.

When the hydraulic clutch type speed change device 50 is in engagement with the first speed, and the movable swash plate 24 of the HST lies at the neutral position, the speed change lever 202 and the swash plate control arm 203 respectively take positions as illustrated in FIG. 14(a). From these positions, when pivotally moving the speed change lever 202 around the axis of the support shaft 201 (direction as indicated by the arrow A), and hence slanting the movable swash plate 24 to the maximum slanting angle, the speed change lever 202 and the swash plate control arm 203 respectively take positions as illustrated in FIG. 14(b). That is, the swash plate control arm 203 has been slantingly moved to θ max corresponding to the maximum slanting angle of the movable swash plate 24.

When pivotally moving the speed change lever 202 around the pivoting shaft 206 (direction indicated by the arrow B) from the above position, the spool 204 that is operated in association with the speed change lever 202 is axially moved, and hence the hydraulic clutch type speed change device is brought into engagement with the second speed. Along with the pivotal movement of the speed change lever 202 around the pivoting shaft 206, the swash plate control arm 203 tends to move in the same direction (direction indicated by the arrow B). However, the swash plate control arm 203 cannot move in the direction of arrow B since it is axially non-slidably supported on the support shaft 201. Therefore, the inner periphery of the slit 203e acts as a cam follower surface, so that the swash plate control arm 203 is returned in the reverse direction to the direction of arrow A by a predetermined angle (Δθ). Whereby, the movable swash plate 24 connected to the swash plate control arm 203 is returned to its speed reducing side.

Figure 15:
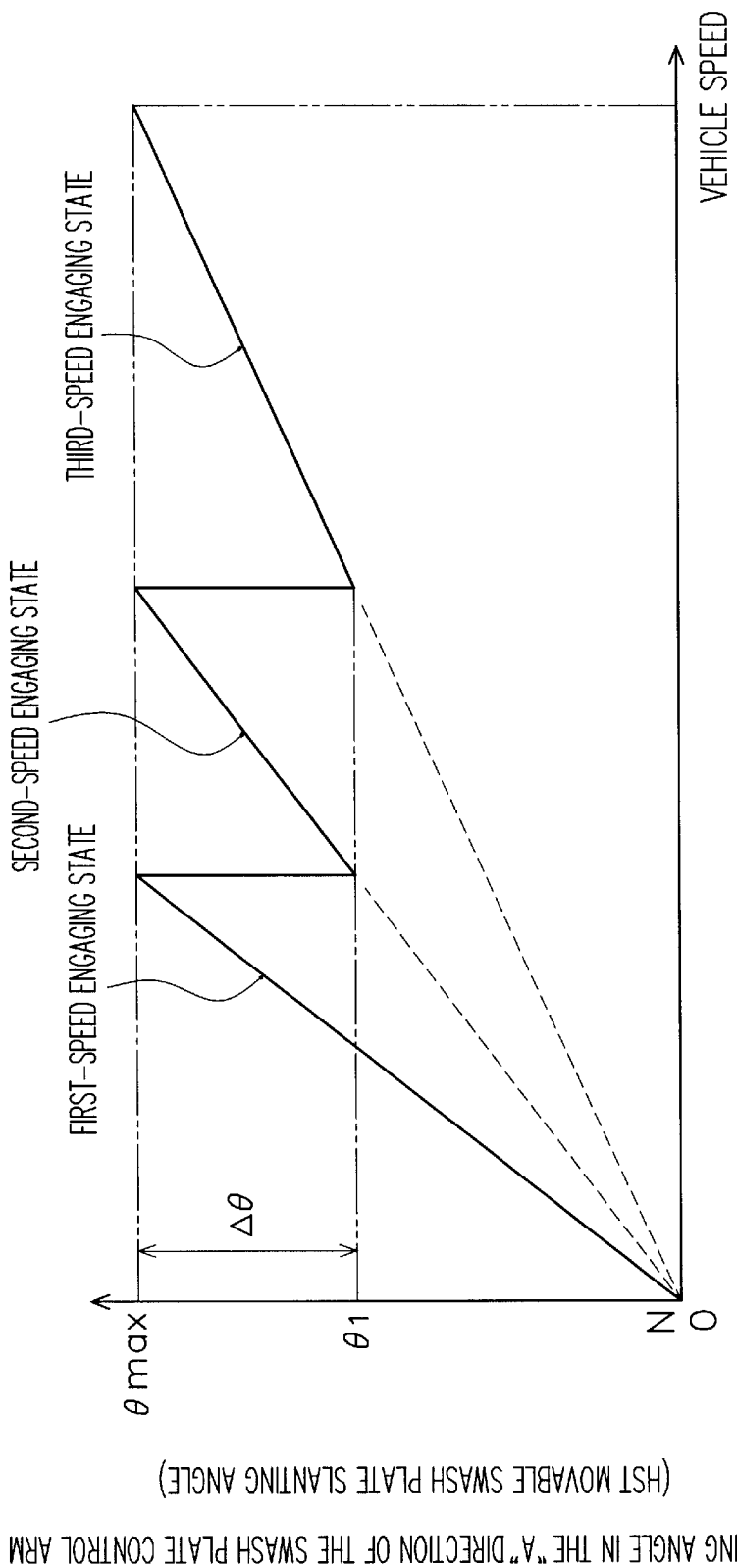
FIG. 15 is a graph showing the relationship between the pivoting angle of the swash plate control arm and the vehicle speed.

In the speed change operation mechanism 200 having the above arrangement, while both the hydraulic clutch type speed change device 50 and the HST swash plate 24 are operated merely by the operation lever 200, abrupt changes in vehicle speed due to the speed change operation of the hydraulic clutch type speed change device can effectively be prevented. FIG. 15 is a graph showing the relationship between the slanting angle of the HST swash plate and the vehicle speed.

As shown in FIG. 15, in case that the hydraulic clutch type speed change device 50 is in engagement with the first speed, the vehicle speed is increased in proportion to the moving distance of the HST swash plate control arm 203 in the A direction. The speed change lever 202 is then pivotally moved in the B direction to upshift the hydraulic clutch type speed change device from the first speed to the second speed. Along with this upshifting of the hydraulic clutch type speed change device to the second speed, the swash plate control arm is returned by Δθ, and hence the swash plate is returned by Δθ. In the speed change operation device 200, speed gain due to the upshifting of the hydraulic clutch type speed change device is offset by speed loss of the HST due to the returning of the movable swash plate by Δθ when upshifting the hydraulic clutch type speed change device, so that the vehicle speed is held constant. The swash plate control arm is then pivotally moved in the A direction by Δθ, thereby producing the maximum vehicle speed in a state with the hydraulic clutch type speed change device 50 engaged with the second speed.

The speed change operation device thus enables both the hydraulic clutch type speed change device and the HST swash plate to be operated merely by operating the single operation lever, as well as effectively prevents the change in vehicle speed due to the upshifting or downshifting of the hydraulic clutch type speed change device. Therefore, it is possible to improve the running performance of the vehicle, as well as effectively preventing disorders of the hydraulic clutch type speed change device or the like due to the abrupt change in vehicle speed.

This embodiment has been described by taking for example the case where the movable swash plate is slantingly moved by the hydraulic servo mechanism. However, this slanting movement of the movable swash plate may be achieved by a mechanical link mechanism or any other mechanisms.

The angular displacement Δθ of the movable swash plate may be set at a desirable value by suitably determining the predetermined angle of the slit 203e. The slit 203e may also have a crooked shape in plan. That is, a first region of the slit, along which the first portion 202a of the speed change lever 202 passes when the hydraulic clutch type speed change device is shifted between the first and second speeds has the predetermined angle different from the predetermined angle of a second region of the slit, along which the first portion 202a of the speed change lever 202 passes when the hydraulic clutch type speed change device is shifted between the second and third speeds. Whereby, the angular displacement Δθ of the movable swash plate in the shifting operation of the hydraulic clutch type speed change device may be set independently for each speed stage.

The speed change operation mechanism 200 used in this embodiment is designed to mechanically control the hydraulic clutch type speed change device and the HST unit. Alternatively, it is possible to employ the speed change operation mechanism of the type that electrically controls them.

Figure 16:
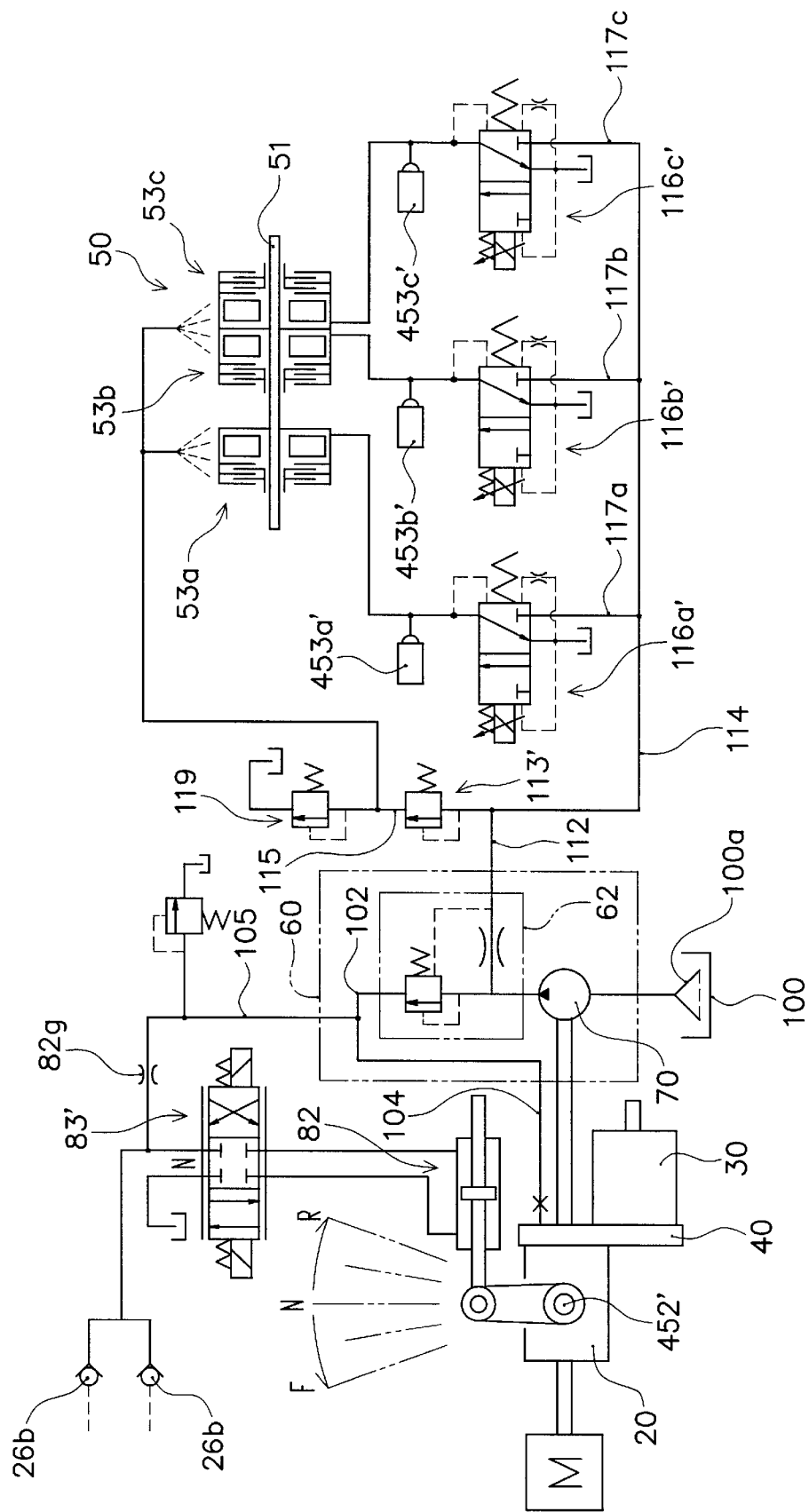
FIG. 16 is a hydraulic circuit diagram of the transmission using a speed change operation mechanism of the electric control type.

FIG. 16 is a hydraulic circuit diagram of the transmission using a speed change operation mechanism of the electric control type.

As illustrated in FIG. 16, in the embodiment, electromagnetically actuated servo valve 83' is used in place of the directional control valve 83 of the manual type, and proportional electromagnetic valves 116a', 116b' and 116c' for the shifting between the first and third speeds are used in place of the hydraulic clutch switching valve 116.

Figure 17:
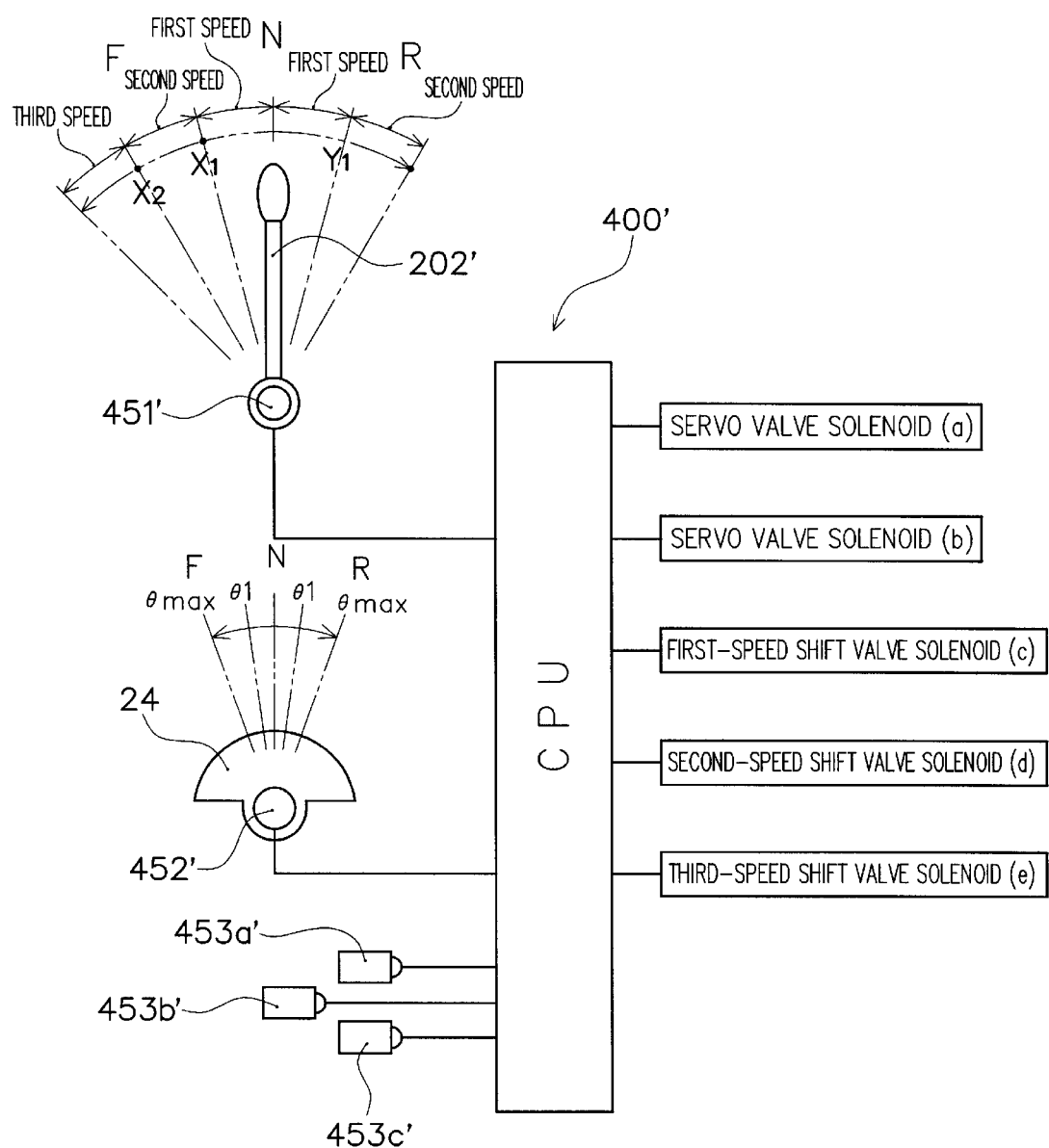
FIG. 17 is a model view illustrating the speed change operation mechanism of the electric control type illustrated in FIG. 16.

FIG. 17 is a model view illustrating the speed change operation mechanism of the electric control type.

As illustrated in FIG. 17, the speed change operation mechanism of the electric control type includes speed change lever 202', signal detection part and control unit 400'.

The signal detection part includes first potentiometer 451' that acts as a means of detecting the angular position of the speed change lever 202', second potentiometer 452' that acts as a means of detecting the slanting angle of the swash plate 24 of the HST, and first to third pressure switches 453a'–453c' that respectively act as means of detecting the hydraulic pressures in the first- to third-speed hydraulic clutch lines 117a–117c.

The control unit 400' includes a processing unit having a CPU, and a storage unit having a ROM and RAM.

The storage unit stores data as to which speed stage of the hydraulic clutch type speed change device 50 is to be engaged according to the angular position of the operation lever 202', data representative of the slanting angle of the swash plate 24 according to the angular position of the operation lever 202', and data representative of the pressure gradient in each hydraulic clutch line during the shifting operation of the hydraulic clutch type speed change device 50.

The speed change operation mechanism of the electric control type having the above arrangement is operated in the manner stated below.

During the operation lever 202' lies within a range between N-position and X1-position, the control unit controls the servo valve 83' to bring the first speed shift valve 116a' into engaging state, and slantingly move the movable swash plate 24 from the N-position to θ max according to the angular position of the operation lever 202'. Therefore, when the operation lever 202' lies at the X1-position, the movable swash plate 24 is slantingly moved to the maximum slanting angle θ max, with the first shift valve 116a' held in the engaging state.

Once the operation lever 202' passes the X1-position, the control unit controls the servo valve 83' to bring the second shift valve 116b' into engaging state, while shutting off the first shift valve 116a', and return the movable swash plate 24 to θ1. During the operation lever 202' lies in a range between the X1-position and the X2-position, the control unit controls the servo valve 83' to slantingly move the movable swash plate 24 from θ1 to θ max according to the angular position of the operation lever 202', while holding the second shift valve 116b' in the engaging state.

Likewise the speed change operation mechanism of the mechanical control type, the speed change operation mechanism of the electric control type can thus operate both the hydraulic clutch type speed change device and the HST swash plate merely by operating the single operation lever, as well as effectively preventing changes in vehicle speed due to shifting of the hydraulic clutch type speed change device.

In the speed change operation mechanism of the electric control type, hydraulic pressure ascending gradients in the respective hydraulic clutch lines 117a–117c can be controlled by on-off control of the proportional electromagnetic valves 116a'-116c' based upon the signals from the pressure switches 453a'–453c'. Therefore, the delay relief valve 113 is not necessarily used, rather, it is replaced by relief valve 113' of a common type.

This specification is by no means intended to restrict the present invention to the preferred embodiments set forth therein. Various modifications to the transmission for vehicle, as described herein, may be made by those skilled in the art without departing from the spirit and scope of the present invention as defined in the appended claims.

What is claimed is:

1. A transmission for a vehicle with a hydrostatic transmission and a power shift device interposed in tandem in a drive power transmission path comprising:

a housing;

first and second plate-like members disposed within said housing in such a manner as to be positioned away from each other along a drive power transmission direction, while respectively having each-other facing surfaces, through which said first and second plate-like members face each other;

an input shaft extending through said first plate-like member;

an output shaft disposed parallel with the input shaft and away from the same in a plate surface direction of the first plate-like member;

a hydraulic pump body supported on a surface opposite to the each-other facing surface of the first plate-like member, and operatively connected to the input shaft;

a hydraulic motor body supported on the each-other facing surface of the first plate-like member, and being adapted to drive the output shaft upon receiving operational fluid discharged from the hydraulic pump body;

an auxiliary pump disposed on the second plate-like member and being adapted to be driven through the shaft; and wherein the second plate-like member supports thereon a clutch shaft of the power shift device, and has a hydraulic fluid passage for supplying therethrough pressurized hydraulic fluid discharged from said auxiliary pump to a hydraulic clutch on said clutch shaft.

2. A transmission for a vehicle according to claim 1, wherein said input shaft has a downstream end with respect to a drive power transmission direction, said downstream end of the input shaft extending through a center section and being operatively connected to a PTO shaft.

3. A transmission for a vehicle according to claim 1, wherein said output shaft and said clutch shaft are disposed coaxial with each other and are relatively non-rotatably connected to each other.

4. A transmission for a vehicle according to claim 1, wherein:

said housing includes a flywheel housing for accommodating a flywheel, an intermediate housing joined to said flywheel housing and a clutch housing joined to said intermediate housing for accommodating the power shift device;

said first plate-like member is designed to be fixed to said flywheel housing or said intermediate housing in proximity to a joined portion between the said flywheel housing and the intermediate housing, while supporting the hydraulic pump body and the hydraulic motor body;

said second plate-like member is designed to be fixed to the intermediate housing and the clutch housing in proximity to a joined portion between the intermediate housing and the clutch housing; hydraulic pump body, said hydraulic motor body and said first plate-like member are enclosed within an accommodation member made up of the flywheel housing and the intermediate housing when both the housings have been joined together; and said second plate-like member is enclosed within an accommodation member made up of the intermediate housing and the clutch housing when both the housings have been joined together.

5. A transmission for a vehicle according to claim 4, further comprising a PTO shaft disposed coaxial with the input shaft and operatively connected to the same, and a driven shaft having a hollowed body, into which said PTO shaft is inserted.

6. A transmission for a vehicle according to claim 1, wherein said power shift device includes a driven shaft disposed substantially parallel to the clutch shaft and a plurality of hydraulic clutches for stepwisely changing the speed of the drive power between the clutch shaft and the driven shaft, in addition to the clutch shaft that is disposed coaxial with the output shaft and relatively non-rotatably connected to the same.

* * * * *